(12) United States Patent
Chen et al.

(10) Patent No.: US 12,259,574 B2
(45) Date of Patent: Mar. 25, 2025

(54) LIGHTING KEYBOARD, BACKLIGHT MODULE AND LIGHTING BOARD

(71) Applicant: DARFON ELECTRONICS CORP., Taoyuan (TW)

(72) Inventors: Chao-Yu Chen, Taoyuan (TW); Heng-Yi Huang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/376,818

(22) Filed: Oct. 4, 2023

(65) Prior Publication Data

US 2024/0134112 A1 Apr. 25, 2024
US 2024/0230982 A9 Jul. 11, 2024

Related U.S. Application Data

(60) Provisional application No. 63/453,761, filed on Mar. 22, 2023, provisional application No. 63/439,158, (Continued)

(30) Foreign Application Priority Data

Oct. 4, 2023 (TW) .................................. 112138085

(51) Int. Cl.
*F21V 8/00* (2006.01)
*H01H 13/02* (2006.01)

(52) U.S. Cl.
CPC ......... *G02B 6/0091* (2013.01); *G02B 6/0068* (2013.01); *H01H 13/023* (2013.01); *H01H 2219/06* (2013.01); *H01H 2219/062* (2013.01)

(58) Field of Classification Search
CPC .. G02B 6/0091; G02B 6/0068; H01H 13/023; H01H 2219/06; H01H 2219/062
See application file for complete search history.

(56) References Cited

U.S. PATENT DOCUMENTS 6,743,993 B1 6/2004 Clark
9,040,856 B2 5/2015 Chen
(Continued)

FOREIGN PATENT DOCUMENTS

CN 101514801 A 8/2009
CN 201758091 U 3/2011
(Continued)

OTHER PUBLICATIONS

Chen, the specification, including the claims, and drawings in the U.S. Appl. No. 18/369,217, filed Sep. 18, 2023.
(Continued)

*Primary Examiner* — Mary Ellen Bowman
(74) *Attorney, Agent, or Firm* — Winston Hsu

(57) ABSTRACT

A lighting keyboard includes a backlight module and at least one keyswitch. The backlight module includes a lighting unit, a light guide panel, and a lighting board for illuminating a keycap of the keyswitch. The light guide panel includes a panel hole to accommodate the lighting unit. The light guide panel further includes plural slots intervally surrounding the lighting unit. The lighting board includes a microstructure region facing toward the light guide panel. Each of the slots of the light guide panel has a bulge portion protruding to the lighting unit. At two sides of the bulge portion, each of the slots forms two slots walls with an obtuse angle, thereby expanding the transmitting angle for the multi-color lights from the lighting unit and enhancing the light-mixing uniformity while illuminating the keycap.

22 Claims, 23 Drawing Sheets

Related U.S. Application Data filed on Jan. 16, 2023, provisional application No. 63/413,579, filed on Oct. 5, 2022, provisional application No. 63/378,261, filed on Oct. 4, 2022.

(56) References Cited

U.S. PATENT DOCUMENTS

| | | |
|---|---|---|
| 9,214,301 B2 | 12/2015 | Chen |
| 9,299,515 B2 | 3/2016 | Chen |
| 10,276,327 B2 | 4/2019 | Chen |
| 10,586,664 B2 | 3/2020 | Yeh |
| 11,036,306 B2 | 6/2021 | Cheng |
| 11,257,638 B2 | 2/2022 | Liang |
| 11,371,676 B2 | 6/2022 | Huang |
| 11,409,373 B2 | 8/2022 | Cheng |
| 11,443,907 B2 | 9/2022 | Ho |
| 11,515,107 B2 | 11/2022 | Chen |
| 11,538,641 B2 | 12/2022 | Liang |
| 11,977,250 B2 * | 5/2024 | Liu ............... H01H 13/83 |
| 2009/0140891 A1 | 6/2009 | Ragusa |
| 2011/0037730 A1 | 2/2011 | Wang |
| 2012/0275193 A1 | 11/2012 | Yoshida |
| 2014/0166457 A1 | 6/2014 | Chen |
| 2017/0352504 A1 | 12/2017 | Chen |
| 2018/0149797 A1 | 5/2018 | Chen |
| 2019/0027326 A1 | 1/2019 | Tsai |
| 2019/0369744 A1 | 12/2019 | Wu |
| 2019/0371538 A1 | 12/2019 | Huang |
| 2020/0402748 A1 | 12/2020 | Cheng |
| 2023/0047235 A1 | 2/2023 | Chen |
| 2023/0305214 A1 | 9/2023 | Chen |
| 2023/0314691 A1 | 10/2023 | Liu |
| 2023/0317387 A1 | 10/2023 | Huang |
| 2023/0343525 A1 | 10/2023 | Liu |
| 2023/0377816 A1 | 11/2023 | Liu |

FOREIGN PATENT DOCUMENTS

| | | |
|---|---|---|
| CN | 102385095 A | 3/2012 |
| CN | 203377146 U | 1/2014 |
| CN | 104252987 A | 12/2014 |
| CN | 106301323 A | 1/2017 |
| CN | 106783308 A | 5/2017 |
| CN | 110335775 A | 10/2019 |
| CN | 214310968 U | 9/2021 |
| CN | 113632249 A | 11/2021 |
| JP | 2019-139728 | 8/2019 |
| TW | I269993 | 1/2007 |
| TW | M321552 | 11/2007 |
| TW | M334393 | 6/2008 |
| TW | 200945114 | 11/2009 |
| TW | M395202 U1 | 12/2010 |
| TW | I416565 B | 11/2013 |
| TW | 201419343 A | 5/2014 |
| TW | I494960 B | 8/2015 |
| TW | I527075 B | 3/2016 |
| TW | M548881 U | 9/2017 |
| TW | I604484 B | 11/2017 |
| TW | 201824318 A | 7/2018 |
| TW | I632577 B | 8/2018 |
| TW | 201944442 A | 11/2019 |
| TW | I725894 | 4/2021 |
| TW | 202143270 A | 11/2021 |
| TW | 202205329 A | 2/2022 |
| TW | 202211277 A | 3/2022 |
| TW | I760181 B | 4/2022 |

OTHER PUBLICATIONS

Chen, the specification, including the claims, and drawings in the U.S. Appl. No. 18/368,538, filed Sep. 14, 2023.

* cited by examiner

LIGHTING KEYBOARD, BACKLIGHT MODULE AND LIGHTING BOARD

CROSS REFERENCE TO RELATED APPLICATION

This application claims the benefit of U.S. Provisional Application No. 63/413,579, filed on Oct. 5, 2022. Further, this application claims the benefit of U.S. Provisional Application No. 63/439,158, filed on Jan. 16, 2023. Further, this application claims the benefit of U.S. Provisional Application No. 63/378,261, filed on Oct. 4, 2022. Further, this application claims the benefit of U.S. Provisional Application No. 63/453,761, filed on Mar. 22, 2023. The contents of these applications are incorporated herein by reference.

BACKGROUND OF THE INVENTION

1. Field of the Invention

The present invention relates to a lighting keyboard, a backlight module and a lighting board, and more specifically, to a lighting keyboard, a backlight module and a lighting board capable of improving the overall and single-key light mixing effects and enhancing the overall and single-key color uniformity.

2. Description of the Prior Art

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. Since the thinning lighting keyboard applies a low luminous single-color or multi-color light emitting diode (LED) to illuminate each of square keyswitches, the following problems may occur: 1) main symbols above the LED are over-illuminated and corner symbols of keycaps are too dark; 2) the peripheral brightness of the keycap is inconsistent; and 3) the overall illuminating consistency on a single square keyswitch and on plural keyswitches is both not good.

SUMMARY OF THE INVENTION

One purpose of the present invention is to provide a lighting keyboard, a backlight module and a lighting board capable of improving the overall and single-key light mixing effects and enhancing the overall and single-key color uniformity.

According to one embodiment, the present invention provides a backlight module for illuminating at least one keycap. The backlight module includes a lighting unit, a light guide panel, and a lighting board. The light guide panel has a panel hole to accommodate the lighting unit. The light guide panel further includes a plurality of slots intervally surrounding the lighting unit. The lighting board has at least one pair of non-intersecting traces electrically connected to the lighting unit. The lighting board further includes at least one micro-structure region located between the at least one pair of non-intersecting traces. At least one of the plurality of slots has a bulge portion facing toward the lighting unit.

According to another embodiment, the present invention provides a lighting keyboard including a plurality of keyswitch having a keycap respectively and the aforesaid backlight module located under the plurality of keyswitches.

According to another embodiment, the present invention provides a backlight module for illuminating at least one keycap. The backlight module includes a lighting unit, a light guide panel, a shielding sheet, and a lighting board. The light guide panel has a panel hole to accommodate the lighting unit. The light guide panel further includes two slots oppositely surrounding the lighting unit. The shielding sheet is disposed above the light guide panel. The shielding sheet has an inner reflective section covering above the lighting unit. The lighting board has a micro-structure region reflecting light and facing toward the light guide panel. The two slots have a bulge portion respectively protruding to the lighting unit, and the inner reflective section of the shielding sheet is located between the two bulge portions of the two slots.

According to another embodiment, the present invention provides a lighting board including light guide panel and a substrate. The light guide panel includes a panel hole and at least two slots having at least two bulge portions. The substrate is disposed in parallel to the light guide panel. At least one pair of non-intersecting traces is disposed on the substrate and electrically connected to a lighting unit. The lighting unit is located in the panel hole, and the lighting unit is located between the at least two bulge portions of the at least two slots.

In summary, the present invention can increase the amount of light emitted by the lighting unit entering the light guide panel and utilize the micro-structure regions specifically arranged on the lighting board to recycle light or assist light output, so as to enhance the overall illuminating consistency.

Furthermore, the present invention adopts the optimal configuration of the micro-structure regions and the slots for solving the problem of color light being incident to the adjacent keycaps, the uneven light mixing problem and the slot related problems and making full use of the limited light to achieve the best chroma and color saturation of one single keyswitch. The light mixing effect of the lighting unit can be further improved by the aforesaid arrangement of the three chips.

These and other objectives of the present invention will no doubt become obvious to those of ordinary skill in the art after reading the following detailed description of the preferred embodiment that is illustrated in the various figures and drawings.

DETAILED DESCRIPTION

A low power lighting unit, such as mini LED or micro LED, may be used to reduce power consumption, reduce total heat generated by a backlight module, and reduce the overall thickness of the backlight module, such that it is beneficial to further make a lighting keyboard thinner. However, the highly limited luminous range of mini LED or micro LED causes a great challenge to the luminous uniformity of a single keyswitch and the entire lighting keyboard. The embodiments of the present invention first focus on how to make a large proportion of light from the lighting unit enter a light guide panel for lateral transmission, and how to effectively recycle the light that passes through the light guide panel during the lateral transmission into the light guide panel for reuse.

Figure 1:
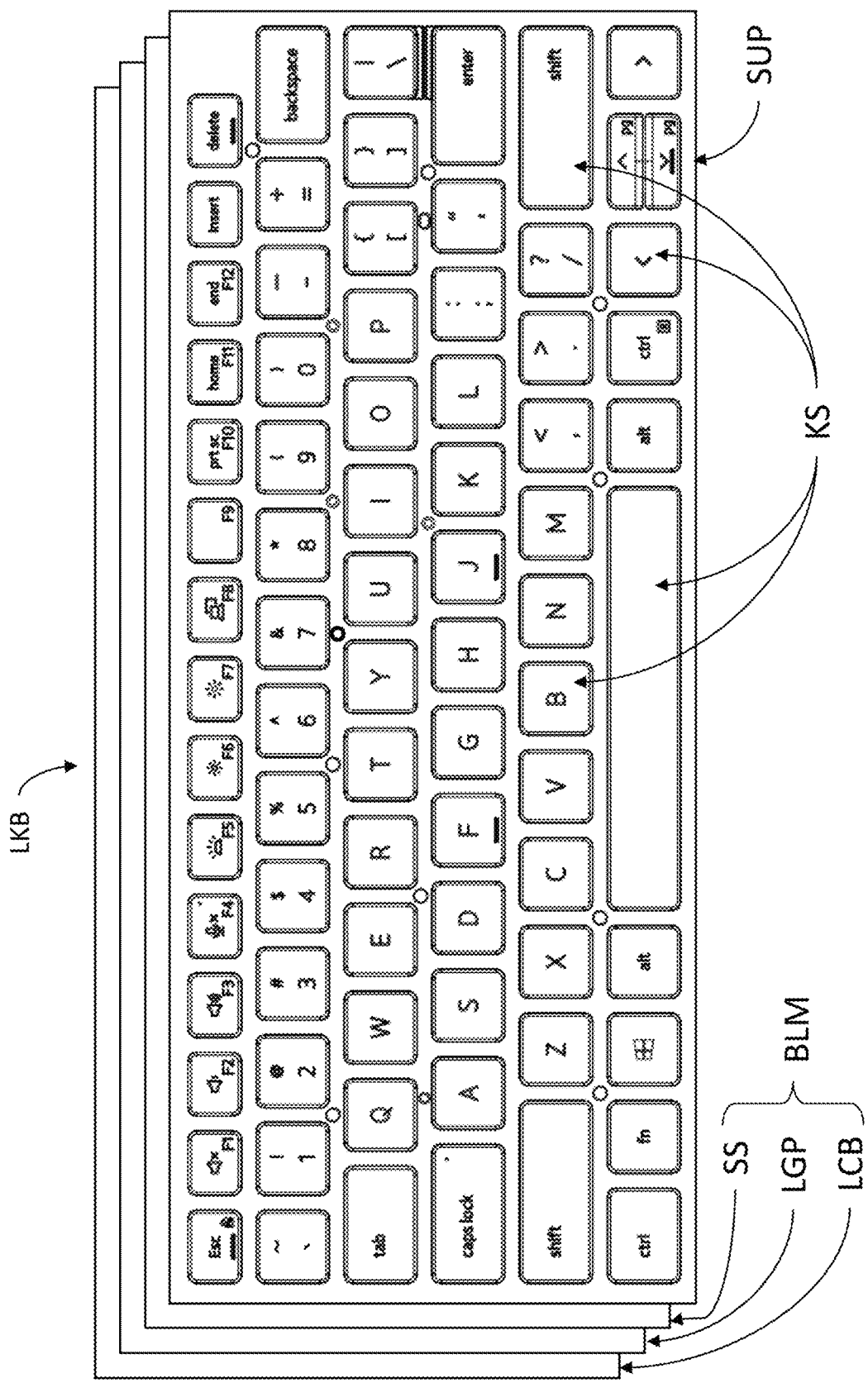
FIG. 1 is a schematic view illustrating a lighting keyboard according to an embodiment of the invention.

Please refer to FIG. 1, which is a schematic view illustrating a lighting keyboard LKB according to an embodiment of the present invention.

As shown in FIG. 1, the lighting keyboard LKB includes a backlight module BLM and a plurality of keyswitches KS. A support plate SUP is disposed on the backlight module BLM and the keyswitches KS are disposed on the support plate SUP. In general, the keyswitches KS may include small keys (e.g., function/direction key), square keys (e.g., text/numeric key) and multiple keys (e.g., space key). It should be noted that the number, size and arrangement of the keyswitches KS may be determined according to practical applications, so the present invention is not limited to the embodiments shown in the figures.

The backlight module BLM includes a lighting board LCB, a light guide panel LGP and a shielding sheet SS. The light guide panel LGP is disposed on the lighting board LCB and the shielding sheet SS is disposed on the light guide panel LGP. Each keyswitch KS on the lighting keyboard LKB corresponds to at least one lighting unit (e.g., LED) on the lighting board LCB of the backlight module BLM.

Figure 2:
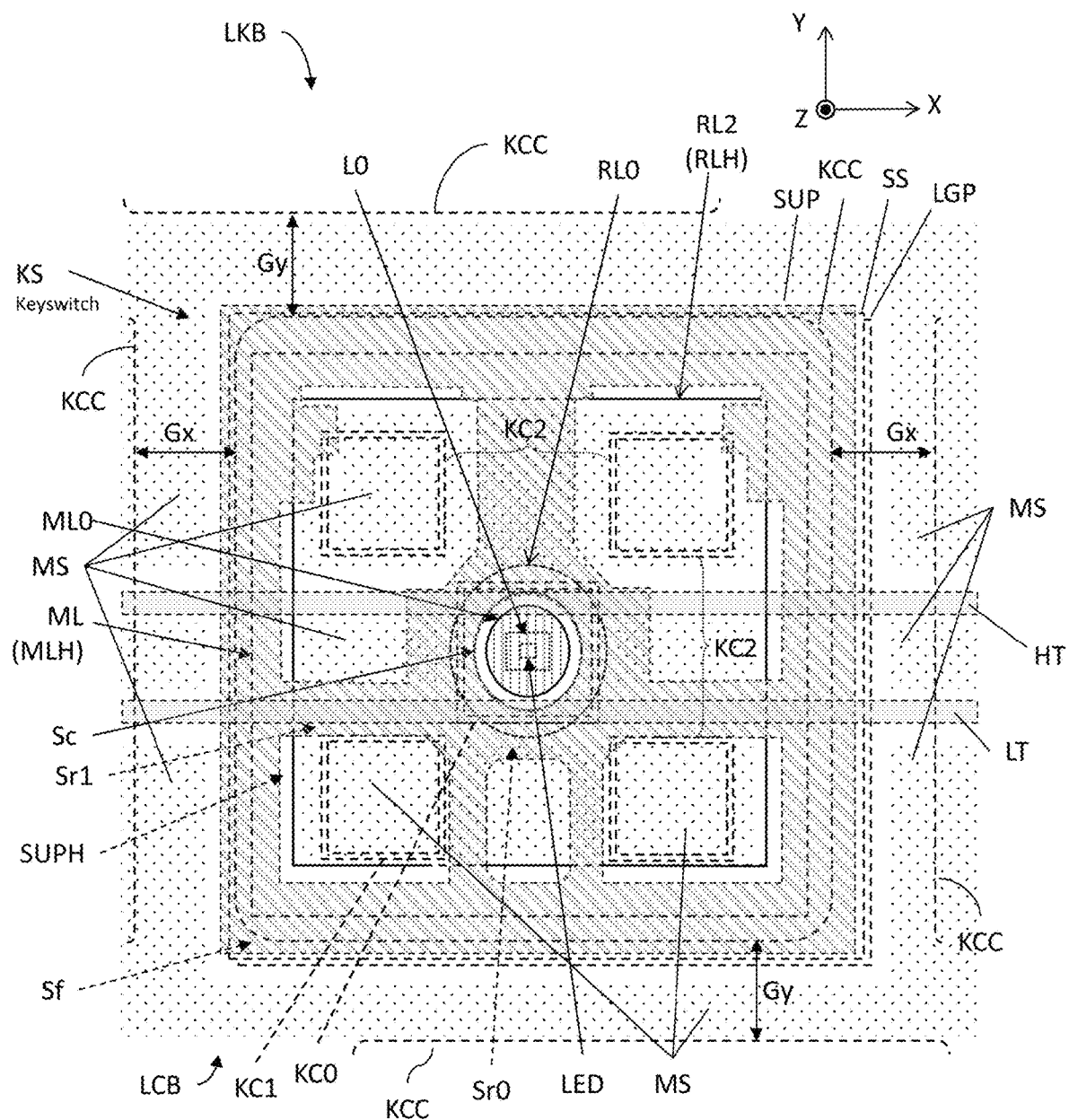
FIG. 2 is a partial top view illustrating the lighting keyboard shown in FIG. 1.
Figure 3:
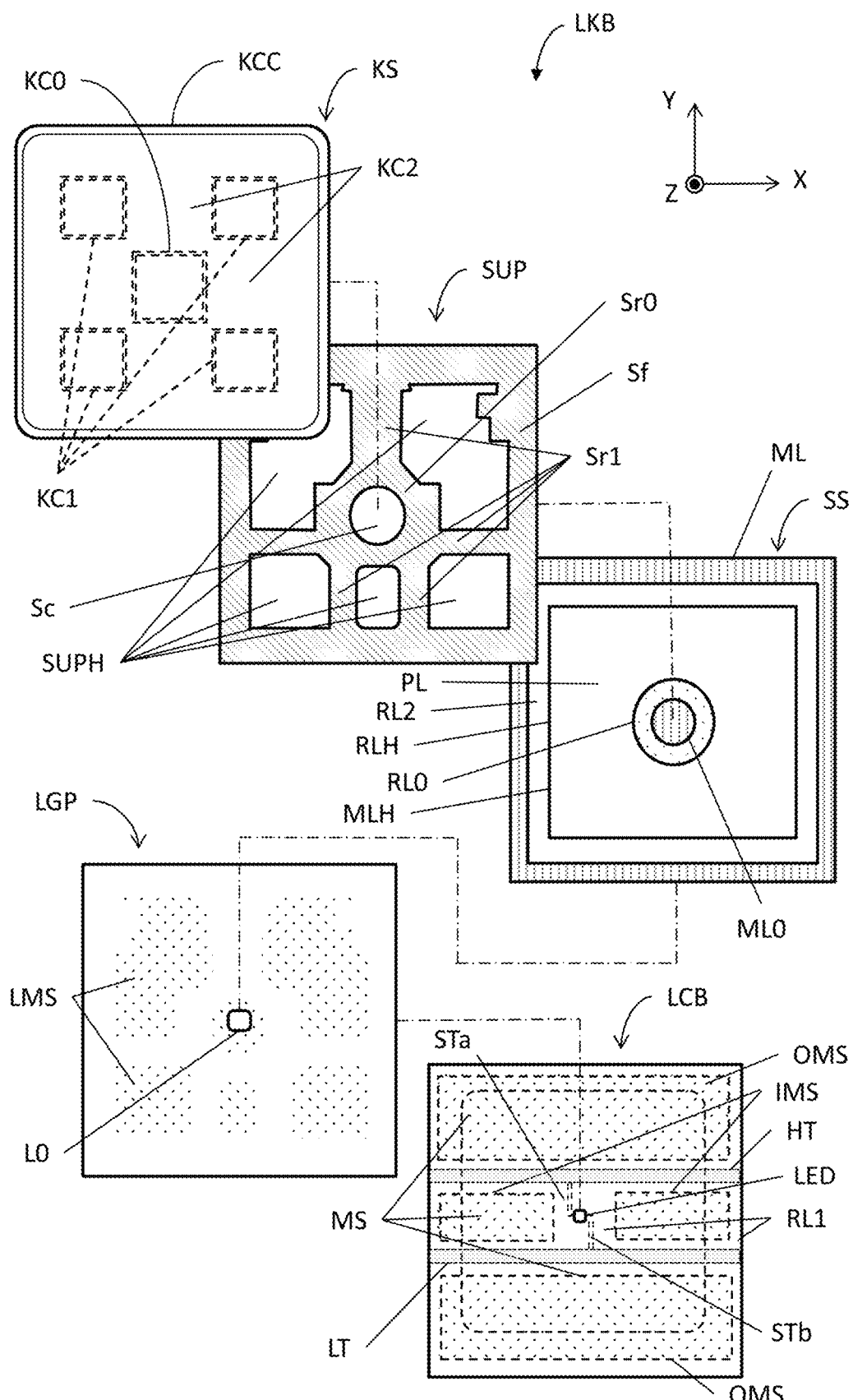
FIG. 3 is a partial exploded view illustrating the lighting keyboard shown in FIG. 1.
Figure 4:
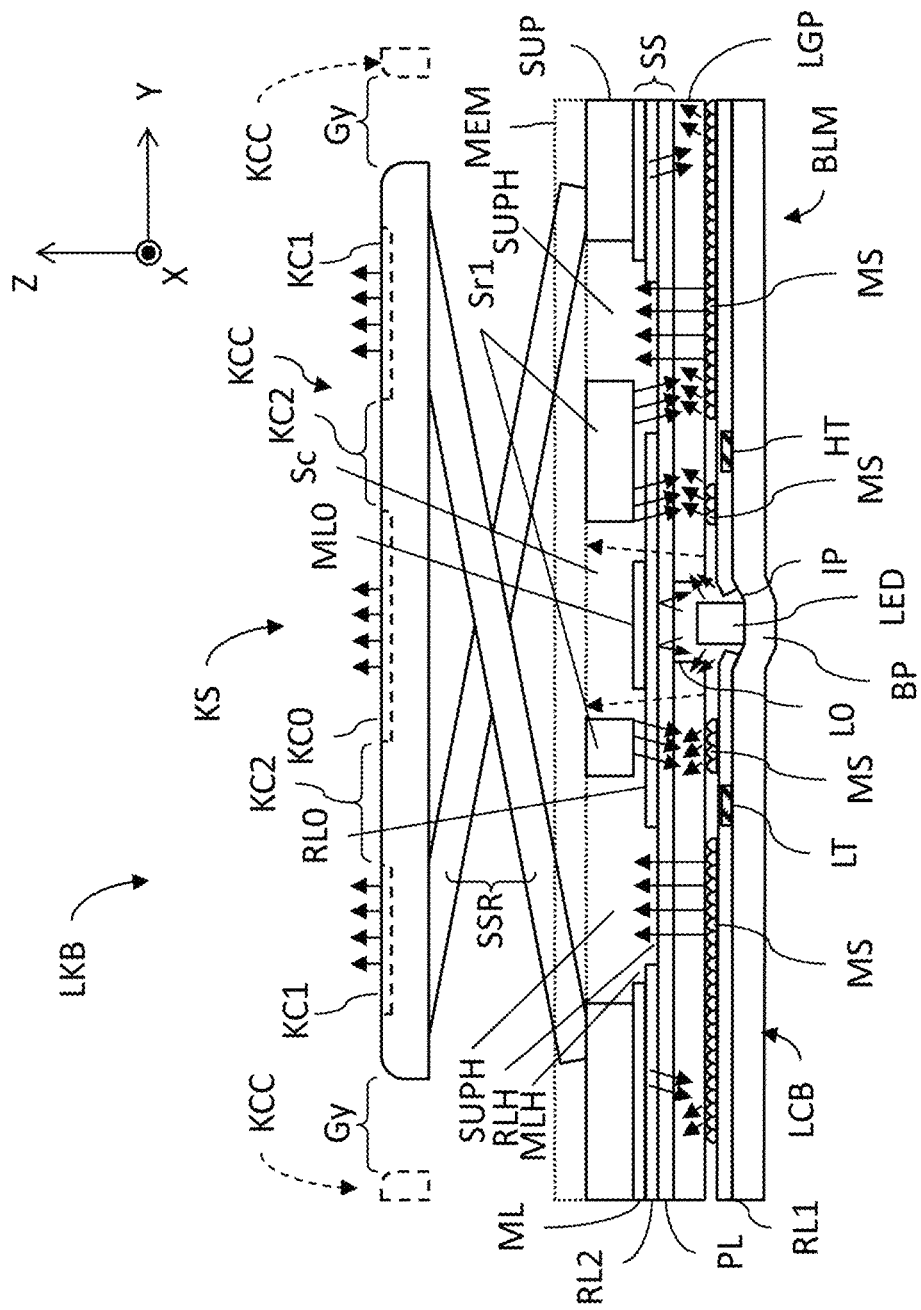
FIG. 4 is a partial sectional view illustrating the lighting keyboard shown in FIG. 1.

Please refer to FIGS. 2-4. FIG. 2 is a partial top view illustrating the lighting keyboard LKB shown in FIG. 1, FIG. 3 is a partial exploded view illustrating the lighting keyboard LKB shown in FIG. 1, and FIG. 4 is a partial sectional view illustrating the lighting keyboard LKB shown in FIG. 1.

As shown in FIGS. 2-4, the lighting board LCB includes two non-intersecting traces LT, HT, another two non-intersecting traces STa, STb, a lighting unit LED, a first reflective layer RL1 and a plurality of micro-structure regions MS. The lighting board LCB may be a lighting circuit board having circuitry and light sources disposed on a substrate. The lighting unit LED is connected between the two non-intersecting traces STa, STb, and the lighting unit LED is connected between the two non-intersecting traces LT, HT through the two non-intersecting traces STa, STb. In this embodiment, the traces LT, HT are main traces of the lighting unit LED and the traces STa, STb are sub-traces of the lighting unit LED, wherein the trace LT may be a low-voltage trace and the trace HT may be a high-voltage trace. The lighting unit LED may be a white LED or a combination of RGB LEDs according to practical applications. In general, the traces LT, HT may be the main traces with a larger cross-sectional area and may cross a plurality of keyswitches KS. The traces LT, HT do not intersect at least within a range of a single keyswitch KS, or do not intersect within a larger continuous range including a plurality of adjacent keyswitches KS and the gap(s) therebetween. The pair of traces STa, STb disposed within the range of each single keyswitch KS are sub-traces with a smaller cross-sectional area. Although the traces STa, STb may be located at the same line, the ends of the traces STa, STb are respectively connected to two electrodes of the lighting unit LED. Thus, the traces STa, STb do not overlap with each other.

The first reflective layer RL1 is disposed on the two non-intersecting traces LT, HT and the other two non-intersecting traces STa, STb. The micro-structure regions MS are formed on the first reflective layer RL1. In this embodiment, the micro-structure regions MS may be a concave-convex structure formed on the first reflective layer RL1. For example, the lighting board LCB may be composed of a flexible circuit board and a copper mesh may be commonly used to improve the support strength of the circuit board. The first reflective layer RL1 may be formed by coating reflective paint or covering a reflective film on the surface of the flexible circuit board (including the surface of the copper mesh). The grid structure of the copper mesh may make the first reflective layer RL1 form regular concave points (grid points) and convex regions (grid lines). The concave points and convex regions function as reflective points capable of reflecting light back to the light guide panel LGP. In fact, copper trace regions (e.g., traces LT, HT, STa, STb) may also form protruding linear reflective regions. In principle, the copper mesh does not overlap with the traces LT, HT on the flexible circuit board and does not electrically connect the traces STa, STb. In practical applications, the copper mesh can achieve an effect of shielding radio frequency interference, so the copper mesh may be connected to the ground of the traces. However, in practice, a concave-convex reflective structure may not be possible to be formed by any reflective layer covering the copper mesh and traces. If the first reflective layer RL1 is an independent thin film component, the thickness of the first reflective layer RL1 must be thin enough, e.g., lower than the thickness of the copper foil substrate (including the adjacent tiled copper mesh and copper trace region). Furthermore, the first reflective layer RL1 needs to have a high degree of plasticity, so as to form a concave-convex micro-structure on the copper mesh and copper trace region when covering the copper foil substrate. If the first reflective layer RL1 is formed by ink coating, the coating thickness, ink consistency, coating region control, etc. must be strictly controlled; otherwise the hollow space of the original copper foil substrate will be easily filled by ink flow, which will reduce the depth of the reflective micro-structure and the effect of reflective diffusion.

In addition, even if the traces of the lighting board LCB are not copper foil substrate and there is neither a thicker copper trace nor a copper mesh to strengthen the structural strength of the lighting board LCB, a micro-structure with a diffusion effect may still be formed on the first reflective layer RL1. For example, micro-dot ink may be printed on the first reflective layer RL1 to form concave/convex regions as the micro-structure regions MS; or the ink with larger size reflective particles may be used to spray or print the first reflective layer RL1 to simultaneously form the concave/convex regions as the micro-structure regions MS; or, if the first reflective layer RL1 is a layer of reflective film, as long as the surface of the reflective film has reflective particles with medium or low flatness or has a concave-convex reflective surface, the reflective film may be used as the micro-structure regions MS.

In this embodiment, within a range of a single keyswitch KS, the micro-structure regions MS includes two inner micro-structure regions IMS and two outer micro-structure regions OMS, wherein the two inner micro-structure regions IMS are located between the two non-intersecting traces LT, HT, and the two outer micro-structure regions OMS are located beyond the two non-intersecting traces LT, HT. The patterns of the two inner micro-structure regions IMS may be different from the patterns of the two outer micro-structure regions OMS, but the present invention is not so limited. The lighting unit LED is located between the micro-structure regions MS, i.e., the lighting unit LED is located between the two inner micro-structure regions IMS and also located between the two outer micro-structure regions OMS.

In this embodiment, the traces STa, STb separate the two inner micro-structure regions IMS, so the traces STa, STb are also located between the two inner micro-structure regions IMS. Similarly, the traces LT, HT respectively separate one outer micro-structure region OMS and two inner micro-structure regions IMS, so it can also be said that the traces LT, HT are respectively located between one outer micro-structure region OMS and two inner micro-structure regions IMS. In some embodiments, the aforesaid micro-structure regions MS, no matter whether they are the outer micro-structure regions OMS or the inner micro-structure regions IMS, neither overlap with the traces LT, HT, nor overlap with the traces STa, STb. For example, there is the case when the traces of the lighting board LCB are formed by copper traces with copper mesh. If the micro-structure regions MS on the first reflective layer RL1 is only surface-treated and not formed from the underlying copper mesh or other substrates, the micro-structure regions MS/OMS/IMS may overlap with the traces LT, HT, or overlap with the traces STa, STb. The light guide panel LGP has a panel hole L0 and the lighting unit LED is located in the panel hole L0. The top surface and/or the bottom surface of the light guide panel LGP close to the panel hole L0 may have adhesive around the panel hole L0 to adhere the shielding sheet SS and/or the lighting board LCB respectively. Furthermore, the light guide panel LGP also has a plurality of micro-structure regions LMS corresponding to the positions of an inner hole Sc and peripheral holes SUPH of the support plate SUP, so as to guide the light transmitted in the light guide panel LGP to emit out upward. Under the orthographic projection of the peripheral hole SUPH of the support plate SUP, the micro-structure regions LMS of the light guide panel LGP may at least partially overlap with the micro-structure regions MS of the first reflective layer RL1 of the lighting board LCB, such that it may increase the illuminating effect of the light passing through the inner hole Sc and the peripheral hole SUPH, and improve the brightness of the corner symbol of the keycap KCC (outer outlet KC1). The inner micro-structure regions IMS, which is on the first reflective layer RL1 of the lighting board LCB and close to the lighting unit LED, may be used as an optical adjustment manner. When the light output near the lighting unit LED is excessively weakened (e.g., resulted from the area of an inner mask layer ML0 of a mask layer ML of the shielding sheet SS being too large or the light transmittance of an inner reflective section RL0 of a second reflective layer RL2 being too low), at this time, the inner micro-structure regions IMS, which is on the first reflective layer RL1 of the lighting board LCB and close to the lighting unit LED, can enhance the illuminating effect of the light passing through the inner hole Sc or the inner outlet KC0 of the keycap KCC.

A preferred manner to optimize the arrangement of the aforesaid micro-structure regions MS/OMS/IMS is to dispose the traces STa, STb, LT, HT as far as possible to overlap with any rib region or frame region (e.g., surrounding rib Sr0, bridge rib Sr1 and support frame Sf) of the support plate SUP. Thus, the aforesaid micro-structure regions MS/OMS/IMS may correspond to the micro-structure regions LMS of the light guide panel LGP, correspond to the peripheral hole SUPH or the inner hole Sc of the support plate SUP, and correspond to the inner outlet KC0 and the outer outlet KC1 of the keycap KCC. Furthermore, the micro-structure regions MS/OMS/IMS may overlap with the surrounding rib Sr0, the bridge rib Sr1 or the support frame Sf. Although these positions cannot emit light, the micro-structure regions MS/OMS/IMS can help guide the light that escapes from the light guide panel LGP into the light guide panel LGP for recycling, such that it is helpful for enhancing the illuminating effect of the light emitted from the outer side or even another adjacent keyswitch KS. Needless to say, the aforesaid micro-structure regions MS/OMS/IMS may also overlap with the second reflective layer RL2 of the shielding sheet SS (including the inner reflective section RL0 and the outer frame of the second reflective layer RL2), and that is also helpful to recycle light into the light guide panel LGP.

The shielding sheet SS is disposed above the micro-structure regions MS. The shielding sheet SS includes a mask layer ML, a second reflective layer RL2 and a protection layer PL, wherein the mask layer ML, the second reflective layer RL2 and the protection layer PL may be stacked with each other by various manners. For example, each of the mask layer ML, the second reflective layer RL2 and the protection layer PL may be stacked on top, middle or bottom to form the shielding sheet SS. The mask layer ML is opaque. The second reflective layer RL2 may have reflective and translucent characteristics at the same time, i.e., the second reflective layer RL2 may reflect part of the light and allow part of the light to pass through. The mask layer ML may be black ink and the second reflective layer RL2 may be white ink, but the present invention is not so limited. In this embodiment, the mask layer ML has a mask layer hole MLH and an inner mask layer ML0 located in the mask layer hole MLH, and the second reflective layer RL2 has a reflective layer hole RLH and an inner reflective section RL0 located in the reflective layer hole RLH. The mask layer hole MLH may be larger than, equal to or smaller than the reflective layer hole RLH, and the inner mask layer ML0 may be larger than, equal to or smaller than the inner reflective section RL0, wherein it depends on the desired illuminating effect. The inner mask layer ML0 and the inner reflective section RL0 are located above the lighting unit LED. In this embodiment, the inner mask layer ML0 and/or the inner reflective section RL0 above the lighting unit LED is at least partially projected between the two non-intersecting traces LT, HT or between the two non-intersecting traces STa, STb.

Each of the keyswitches KS includes a part of the support plate SUP. In this embodiment, the support plate SUP has an inner hole Sc, a surrounding rib Sr0, a plurality of bridge ribs Sr1 and a support frame Sf, wherein the surrounding rib Sr0 surrounds the inner hole Sc, and the bridge ribs Sr1 connect the surrounding rib Sr0 and the support frame Sf. Furthermore, there are a plurality of peripheral holes SUPH between the bridge ribs Sr1, the surrounding rib Sr0 and the support frame Sf. In this embodiment, the two inner micro-structure regions IMS at least partially overlap with projections of the inner hole Sc, the surrounding rib Sr0, the bridge ribs Sr1 and/or the support frame Sf. Still further, the two outer micro-structure regions OMS at least partially overlap with the projections of the surrounding rib Sr0, the plurality of bridge ribs Sr1 and/or the support frame Sf.

The keyswitch KS includes a keycap KCC, a support mechanism SSR, a circuit board MEM and the support plate SUP. The keycap KCC is disposed with respect to the support plate SUP. The keycap KCC has an inner outlet KC0 and a plurality of outer outlets KC1, wherein the inner outlet KC0 and the outer outlets KC1 are surrounded by an opaque area KC2. The positions of the inner outlet KC0 and the outer outlets KC1 correspond to the positions of the inner hole Sc and the peripheral holes SUPH of the support plate SUP, such that the light emitted by the lighting unit LED may be projected from the inner outlet KC0 and the outer outlets KC1 of the keycap KCC through the light guide panel LGP, the shielding sheet SS, the inner hole Sc and the peripheral holes SUPH of the support plate SUP. The support mechanism SSR is disposed between the keycap KCC and the support plate SUP. When the keycap KCC is pressed, the keycap KCC will move vertically toward the support plate SUP along with the support mechanism SSR. Furthermore, a restoration member (not shown) may be further disposed between the keycap KCC and the support plate SUP, wherein the restoration member may be, but is not limited to, a rubber dome. The circuit board MEM may have a switch (e.g., membrane switch or other trigger switches) corresponding to the keyswitch KS.

From top view, the lighting unit LED, the panel hole L0, the inner reflective section RL0, the inner mask layer ML0, the inner hole Sc, the inner outlet KC0 and the adhesive around the panel hole L0 may be located between the two non-intersecting traces LT, HT and/or STa, STb.

From top view, the lighting unit LED, the panel hole L0, the inner reflective section RL0, the inner mask layer ML0, the inner hole Sc, the inner outlet KC0 and the adhesive around the panel hole L0 may be located between the two inner micro-structure regions IMS.

As shown in FIG. 4, the backlight module BLM further includes a protrusion structure BP, wherein the position of the protrusion structure BP corresponds to the position of the lighting unit LED, and the protrusion structure BP is located between the two non-intersecting traces LT, HT. Furthermore, the protrusion structure BP is also located between the micro-structure regions MS, i.e., the protrusion structure BP is located between the two inner micro-structure regions IMS and also located between the two outer micro-structure regions OMS. In this embodiment, the protrusion structure BP is formed on the lighting board LCB and the protrusion structure BP forms a notch IP for accommodating the lighting unit LED, such that an upper surface of the lighting unit LED is flush with or lower than the upper surface of the light guide panel LGP and higher than a lower surface of the light guide panel LGP. Since the shielding sheet SS is disposed on the light guide panel LGP, the upper surface of the lighting unit LED is also flush with or lower than a lower surface of the shielding sheet SS, such that the shielding sheet SS can be kept flat and will not be pushed by the lighting unit LED to partially enter the inner hole Sc of the support plate SUP. Accordingly, the amount of light emitted by the lighting unit LED entering the light guide panel LGP can be increased, so as to enhance the overall illuminating consistency. Moreover, the circuit board MEM may have a switch disposed with respect to the inner hole Sc of the support plate SUP, such that the switch may partially enter the inner hole Sc of the support plate SUP without interfering with the shielding sheet SS and the lighting unit LED below the shielding sheet SS.

Figure 5:
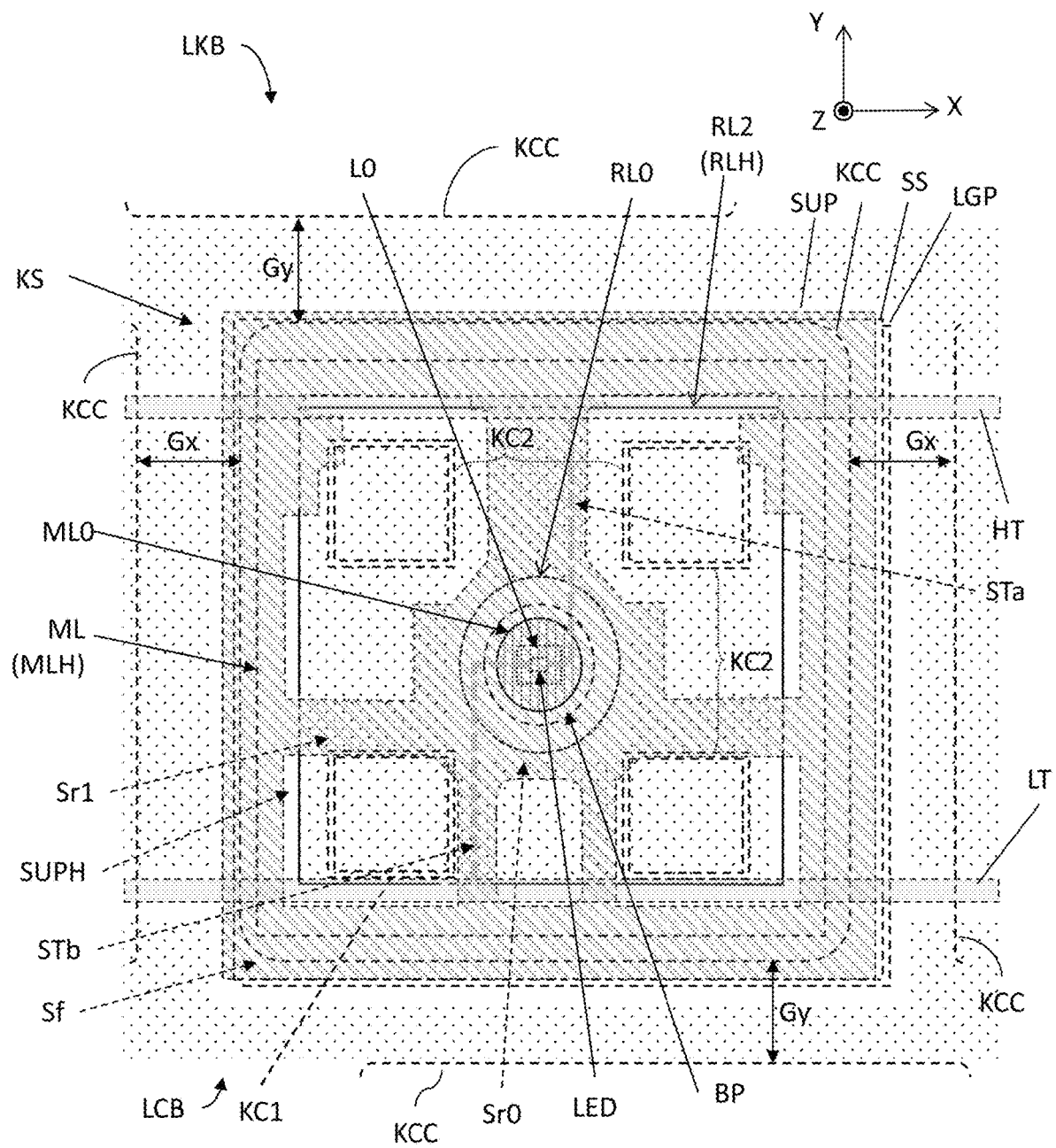
FIG. 5 is a partial top view illustrating a lighting keyboard according to another embodiment of the invention.
Figure 6:
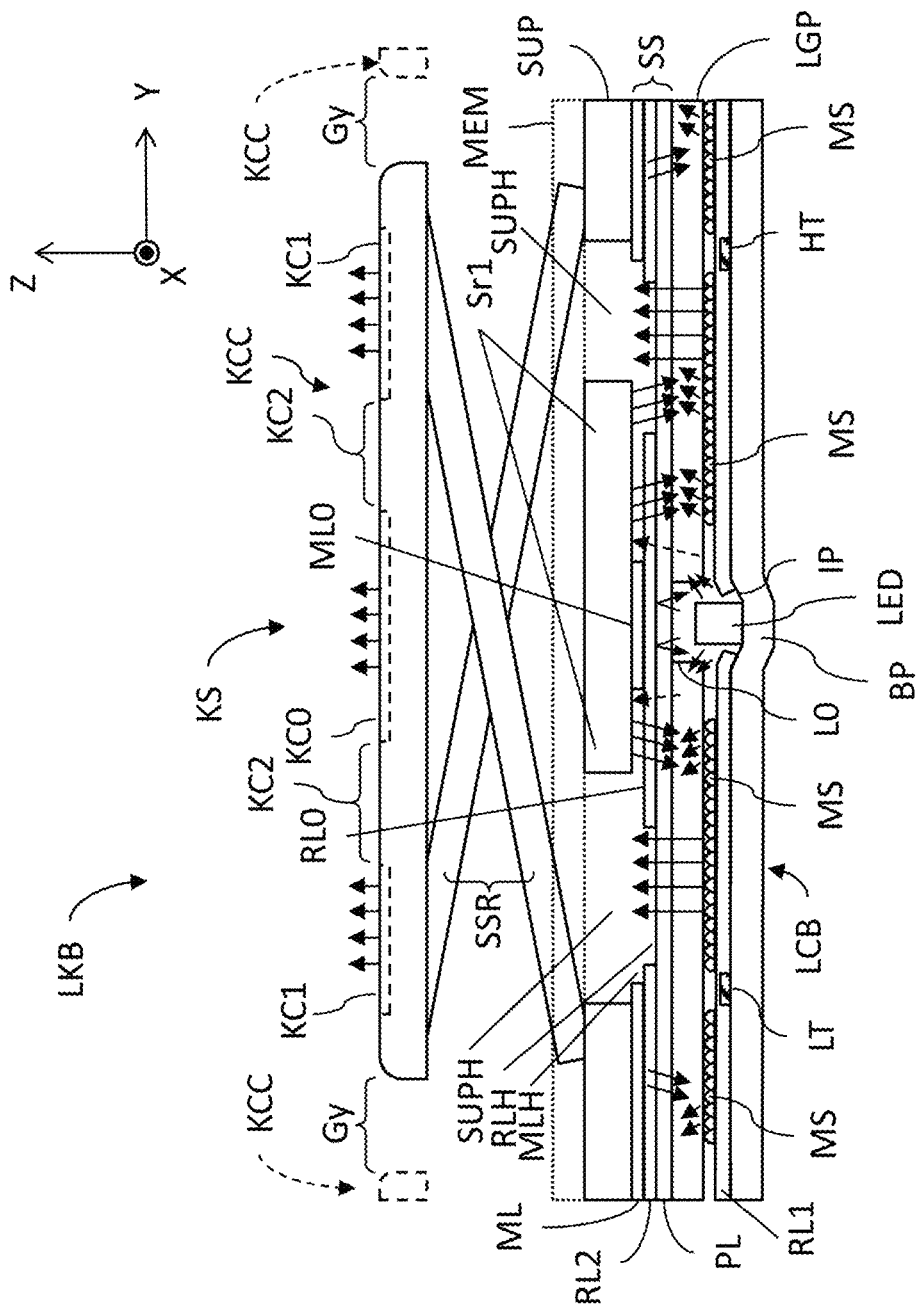
FIG. 6 is a partial sectional view illustrating the lighting keyboard shown in FIG. 5.

Please refer to FIGS. 5 and 6. FIG. 5 is a partial top view illustrating the lighting keyboard LKB according to another embodiment of the present invention, and FIG. 6 is a partial sectional view illustrating the lighting keyboard LKB shown in FIG. 5.

As shown in FIGS. 5 and 6, the support plate SUP may not have the aforesaid inner hole Sc. At this time, the shielding sheet SS is kept flat and will not be pushed by the lighting unit LED. When the support plate SUP does not have the inner hole Sc, the keycap KCC may have no inner outlet KC0. However, if the keycap KCC has the inner outlet KC0, the peripheral holes SUPH around the central area of the keycap KCC may be used to emit light, such that the light is projected from the inner outlet KC0 without the inner hole Sc. In this embodiment, the two non-intersecting traces HT, LT may overlap with a projection of at least one of the at least one outer outlet KC1. As long as the two non-intersecting traces HT, LT meet at least one of the following three conditions, the traces HT, LT will not affect the light emitted from the outer outlet KC1 of the keycap KCC. Condition 1: the two non-intersecting traces HT, LT overlap with projections of the surrounding rib Sr0, the bridge ribs Sr1 and/or the support frame Sf. Condition 2: the two non-intersecting traces HT, LT overlap with projections of the mask layer ML and/or the second reflective layer RL2 of the shielding sheet SS. Condition 3: the two non-intersecting traces HT, LT overlap with projections of the opaque area KC2 of the keycap KCC.

Figure 7:
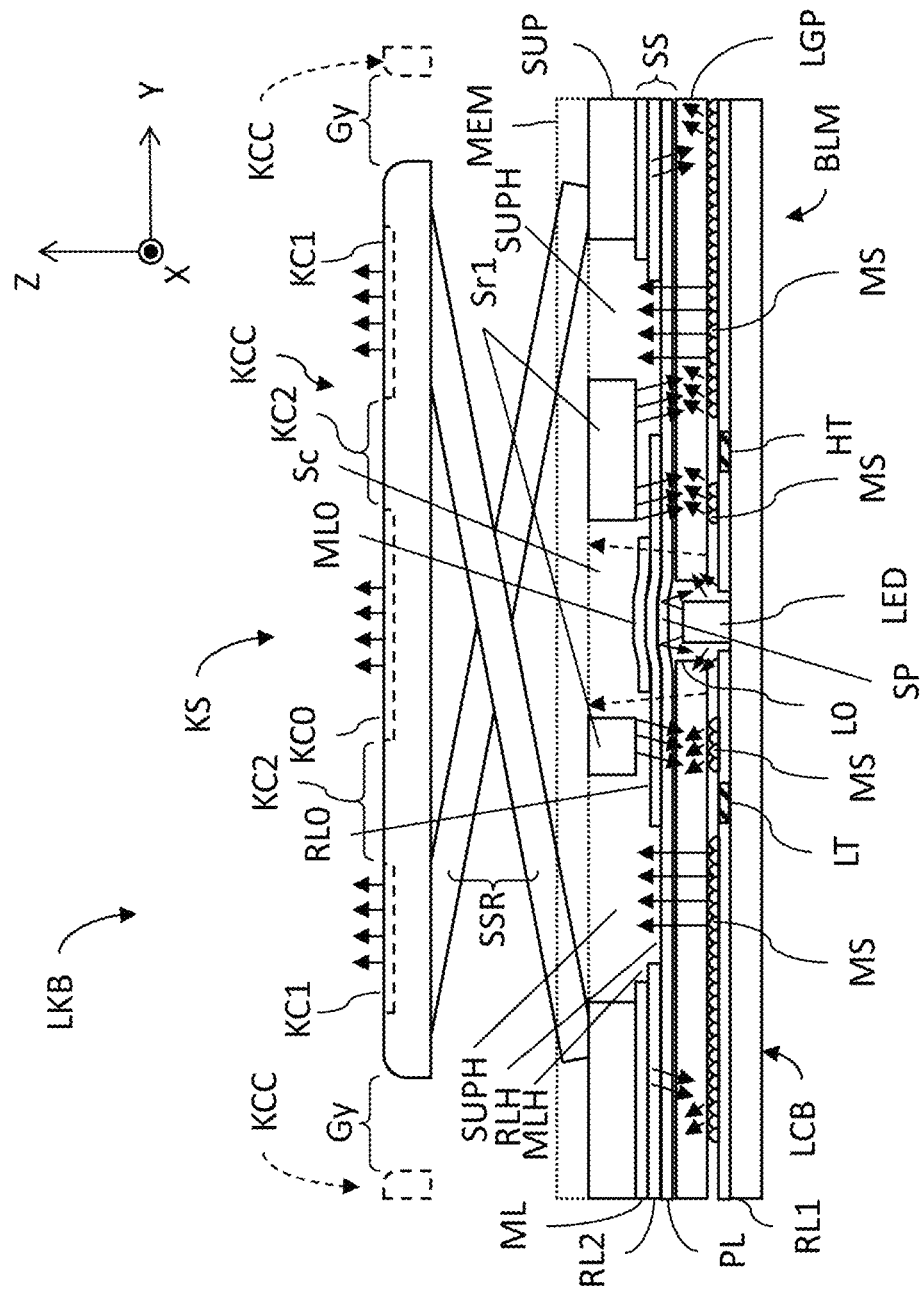
FIG. 7 is a partial sectional view illustrating a lighting keyboard according to another embodiment of the invention.

Please refer to FIG. 7, which is a partial sectional view illustrating the lighting keyboard LKB according to another embodiment of the present invention.

As shown in FIG. 7, a protrusion structure SP of the backlight module BLM may be formed on the shielding sheet SS, wherein the lighting unit LED is located below the protrusion structure SP. The position of the protrusion structure SP corresponds to the position of the lighting unit LED, and the protrusion structure SP is located between the two non-intersecting traces LT, HT. Furthermore, the protrusion structure SP is also located between the micro-structure regions MS, i.e., the protrusion structure SP is located between the two inner micro-structure regions IMS and also located between the two outer micro-structure regions OMS. In this embodiment, the protrusion structure SP may be lower than or slightly enter the inner hole Sc of the support plate SUP, and an upper surface of the lighting unit LED is flush with or lower than an upper surface of the light guide panel LGP or a lower surface of the shielding sheet SS. To be noted, the protrusion structure SP can be pressed back to make the top of the shielding sheet SS below the support plate SUP have a flat surface. In FIG. 7, since the protrusion structure SP is formed on the shielding sheet SS, the second reflective layer RL0 of the shielding sheet SS above the lighting unit LED forms a curved surface or an inclined surface due to the protrusion structure SP. Because the reflection angle provided by the flat second reflective layer RL0 is small, it is difficult to guide the light emitted upward to directly enter the wall of the panel hole L0 of the light guide panel LGP.

Figure 8:
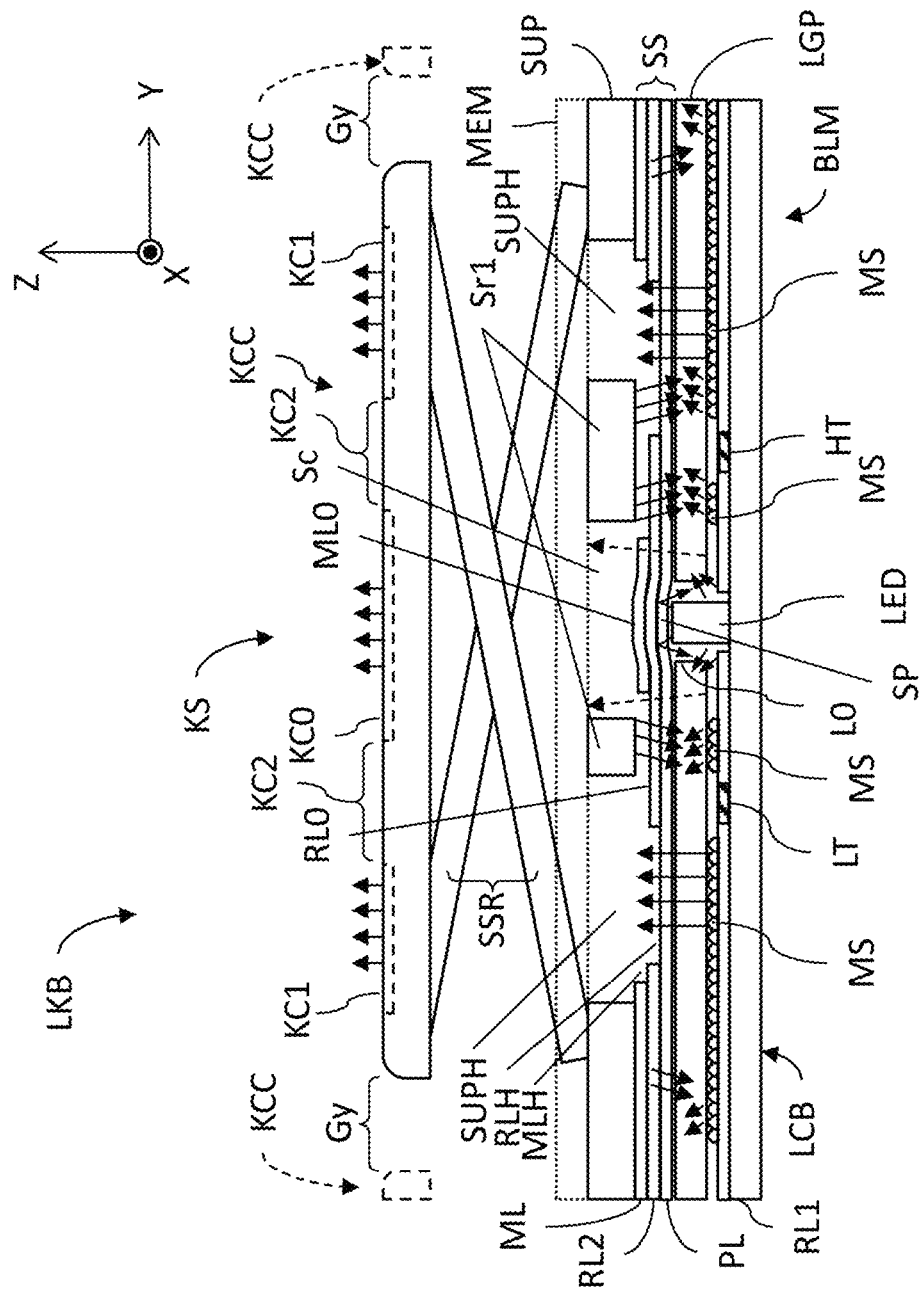
FIG. 8 is a partial sectional view illustrating a lighting keyboard according to another embodiment of the invention.

Please refer to FIG. 8, which is a partial sectional view illustrating the lighting keyboard LKB according to another embodiment of the present invention.

As shown in FIG. 8, an upper surface of the lighting unit LED may be higher than an upper surface of the light guide panel LGP and lower than a lower surface of the shielding sheet SS, i.e., the upper surface of the lighting unit LED may be located between the upper surface of the light guide panel LGP and the lower surface of the shielding sheet SS. In other words, if necessary, the upper surface of the lighting unit LED may exceed the upper surface of the light guide panel LGP. For example, the protrusion structure SP protrudes upward may release the thickness of the shielding sheet SS itself and the thickness of the adhesive layers above and below the shielding sheet SS to provide a space for accommodating the lighting unit LED. At this time, the upper surface of the lighting unit LED is located between the lower surface of the support plate SUP and the upper surface of the light guide panel LGP. Accordingly, when the upper surface of the lighting unit LED is higher than the upper surface of the light guide panel LGP, the protrusion structure SP may provide a space for accommodating the lighting unit LED, so as to prevent the lighting unit LED from interfering with the shielding sheet SS.

Figure 9:
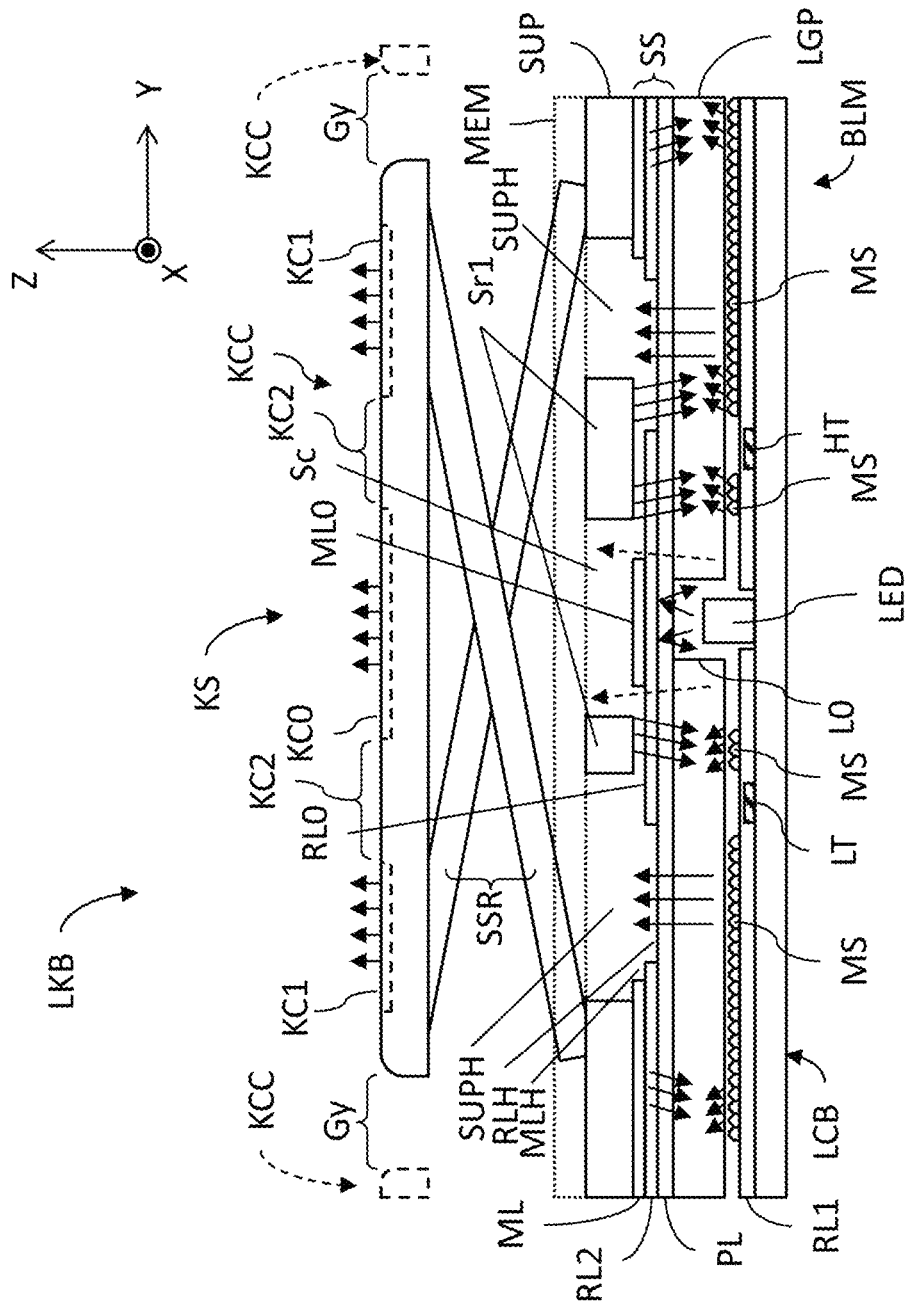
FIG. 9 is a partial sectional view illustrating a lighting keyboard according to another embodiment of the invention.

Please refer to FIG. 9, which is a partial sectional view illustrating the lighting keyboard LKB according to another embodiment of the present invention.

As shown in FIG. 9, the lighting keyboard LKB may not include the protrusion structure BP shown in FIG. 4 or the protrusion structure SP shown in FIG. 7. In this embodiment, an upper surface of the lighting unit LED is flush with or lower than an upper surface of the light guide panel LGP and higher than a lower surface of the light guide panel LGP. Accordingly, the amount of light emitted by the lighting unit LED entering the light guide panel LGP can be increased, so as to enhance the overall illuminating consistency.

Figure 10:
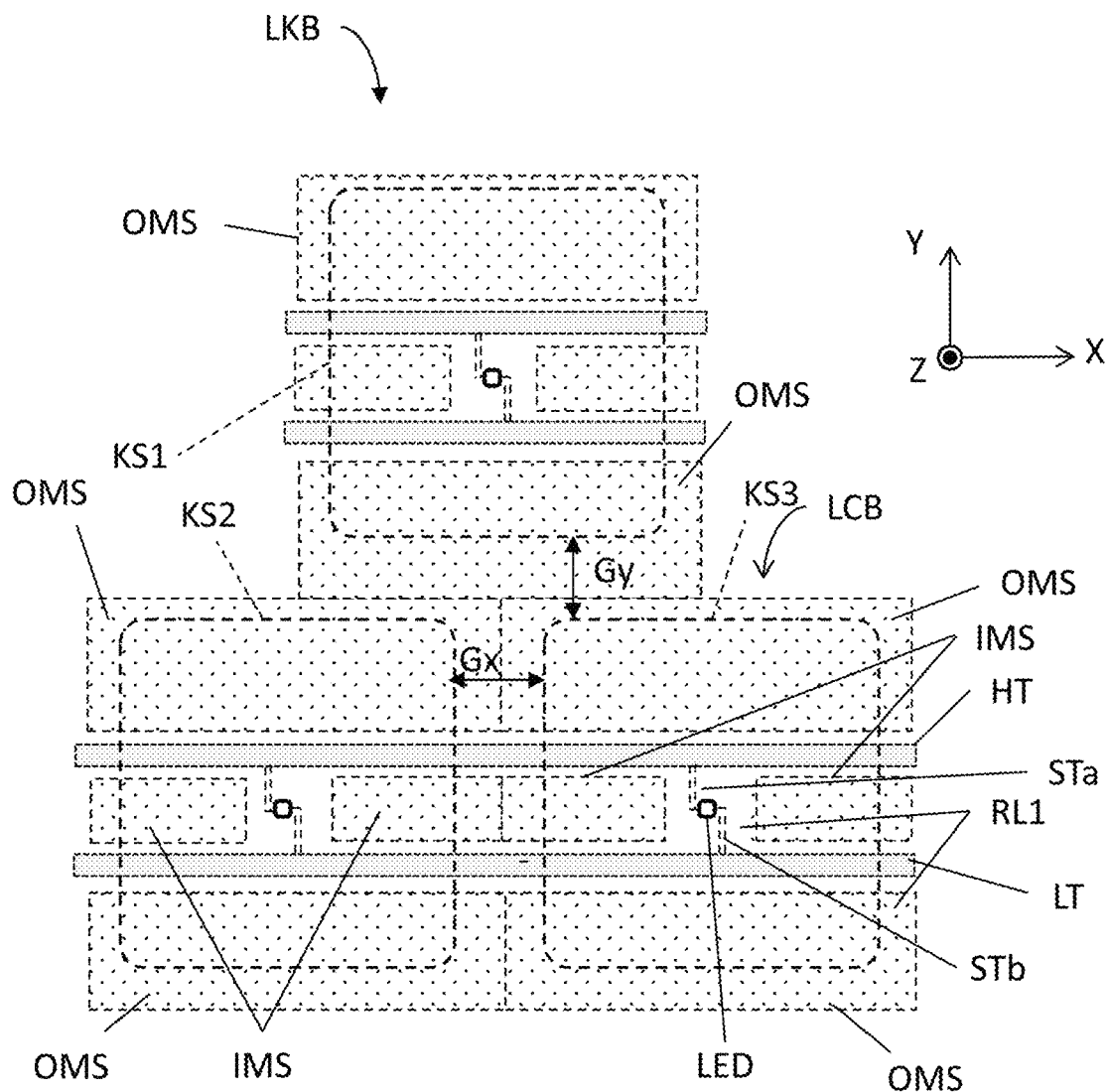
FIG. 10 is another partial top view illustrating the lighting keyboard shown in FIG. 1.

Please refer to FIG. 10, which is another partial top view illustrating the lighting keyboard LKB shown in FIG. 1.

As shown in FIG. 10, at least parts of the micro-structure regions OMS, IMS overlap with the gaps Gx, Gy between any two adjacent keyswitches KS1, KS2, KS3. Three adjacent keyswitches KS1, KS2, KS3 may have three adjacent outer micro-structure regions OMS, wherein the three adjacent outer micro-structure regions OMS are joined together in the X and Y directions. The two outer micro-structure regions OMS disposed outside two non-intersecting traces of the lighting board LCB under a keyswitch KS may have the same pattern, which may have the same size, the same shape and the same distance (outside the traces) in two identical regions. Within the projected range of a single keyswitch KS (e.g., square key), the two outer micro-structure regions OMS may have different patterns defined by the keyswitch KS. For two adjacent keyswitches KS in the Y direction, the two outer micro-structure regions OMS may have different patterns defined by the two adjacent keyswitches KS.

Figure 11:
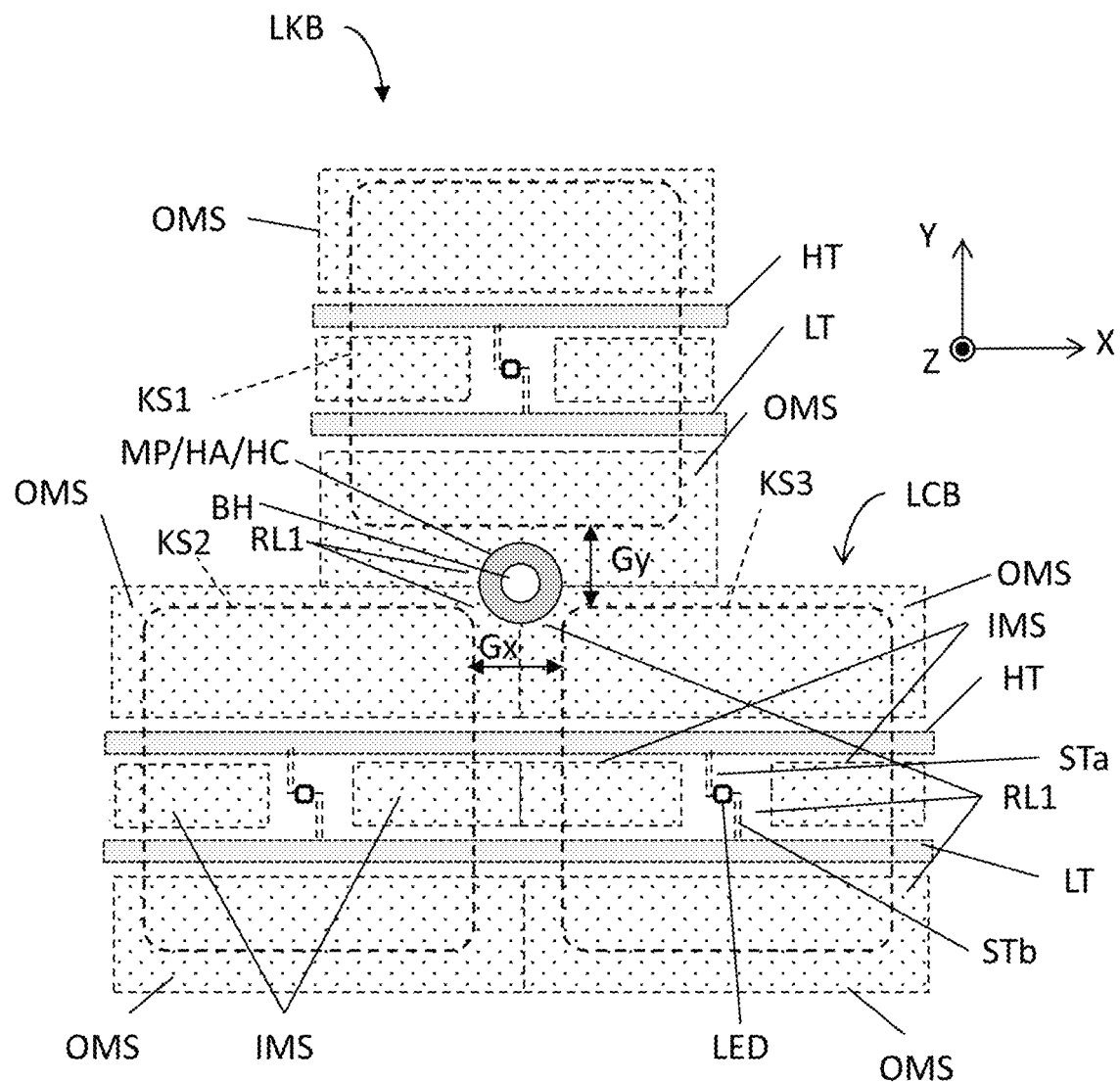
FIG. 11 is another partial top view illustrating the lighting keyboard shown in FIG. 1.

Please refer to FIG. 11, which is another partial top view illustrating the lighting keyboard LKB shown in FIG. 1.

As shown in FIG. 11, a board hole BH may be formed on the lighting board LCB, wherein the board hole BH is used for fixing or heat dissipation. A mask portion MP may be disposed on the lighting board LCB, wherein the mask portion MP surrounds the board hole BH and is used to shield and absorb light, so as to prevent the light from leaking from the board hole BH. In practice, the mask portion MP may be a light absorbing or opaque substrate of the lighting board LCB, i.e., the first reflective layer RL1, a trace layer and an insulating layer (if necessary) above the substrate of the lighting board LCB are all formed with corresponding holes larger than the board hole BH, so as to expose the mask portion MP surrounding the board hole BH. Another manner in practice is to coat a layer of mask portion MP on the upper surface of the first reflective layer RL1 of the lighting board LCB to surround the board hole BH. At this time, the hole size of the first reflective layer RL1 is similar to the board hole BH. The board hole BH and the mask portion MP on the lighting board LCB may correspond to a board hole and a mask portion (not shown) on the shielding sheet SS. A hole adhesive HA on the lighting board LCB may be disposed on the mask portion MP and surround the board hole BH. A hole clearance HC does not overlap with the outer micro-structure regions OMS or any micro-structure. The hole clearance HC without the first reflective layer RL1 may be defined between the first reflective layer RL1 and the board hole BH. The hole clearance HC without an adhesive may be defined between the hole adhesive HA and the board hole BH. The inner micro-structure regions (between the two non-intersecting traces HT, LT and/or between the two non-intersecting traces STa, STb) do not overlap with the board hole BH, the hole adhesive HA and/or the hole clearance HC. A plurality of adjacent keyswitches KS1, KS2, KS3 in the X and/or Y direction may have adjacent outer micro-structure regions OMS that jointly surround the mask portion MP, the board hole BH, the hole adhesive HA and/or the hole clearance HC. The mask portion MP, the board hole BH, the hole adhesive HA and/or the hole clearance HC is located between the traces HT, LT corresponding to the keyswitch KS1 and the traces HT, LT correspond to the keyswitches KS2, KS3. For further explanation, the mask portion MP, the board hole BH, the hole adhesive HA and/or the hole clearance HC may be located between the trace LT corresponding to the keyswitch KS1 and the trace HT correspond to the keyswitches KS2, KS3. It should be noted that the mask portion MP, the hole adhesive HA and the hole clearance HC are schematically illustrated at the same position shown in FIG. 11. However, the definitions of the mask portion MP, the hole adhesive HA and the hole clearance HC can be clearly understood from the above description.

As mentioned in the above, the present invention makes the plurality of micro-structure regions on the lighting board not overlap with the two non-intersecting traces. Accordingly, the micro-structure regions specifically arranged on the lighting board can be used to recycle light or assist light output, so as to enhance the overall illuminating consistency. Furthermore, although the technical feature of the present invention is depicted to solve the problem of low power lighting unit, the present invention is also applicable to an application of medium or high power lighting unit in a backlight module.

Furthermore, although the light guide panel helps to transmit light near the edge of the keycap KCC, other problems may occur in the application of the color illuminated keyboard LKB. For example, in FIGS. 10 and 11, a plurality of keyswitches KS1/KS2/KS3 is arranged adjacently. When the adjacent keyswitches KS1/KS2/KS3 need to emit different color lights, unnecessary light leakage of the adjacent keyswitches KS1/KS2/KS3 through the light guide panel LGP causes discoloration, and also causes the dim color lighting effect of the adjacent keyswitches KS1/KS2/KS3 with insufficient chroma and saturation. The following embodiments of the present invention will introduce several technical solutions to solve the aforesaid problems.

Figure 12A:
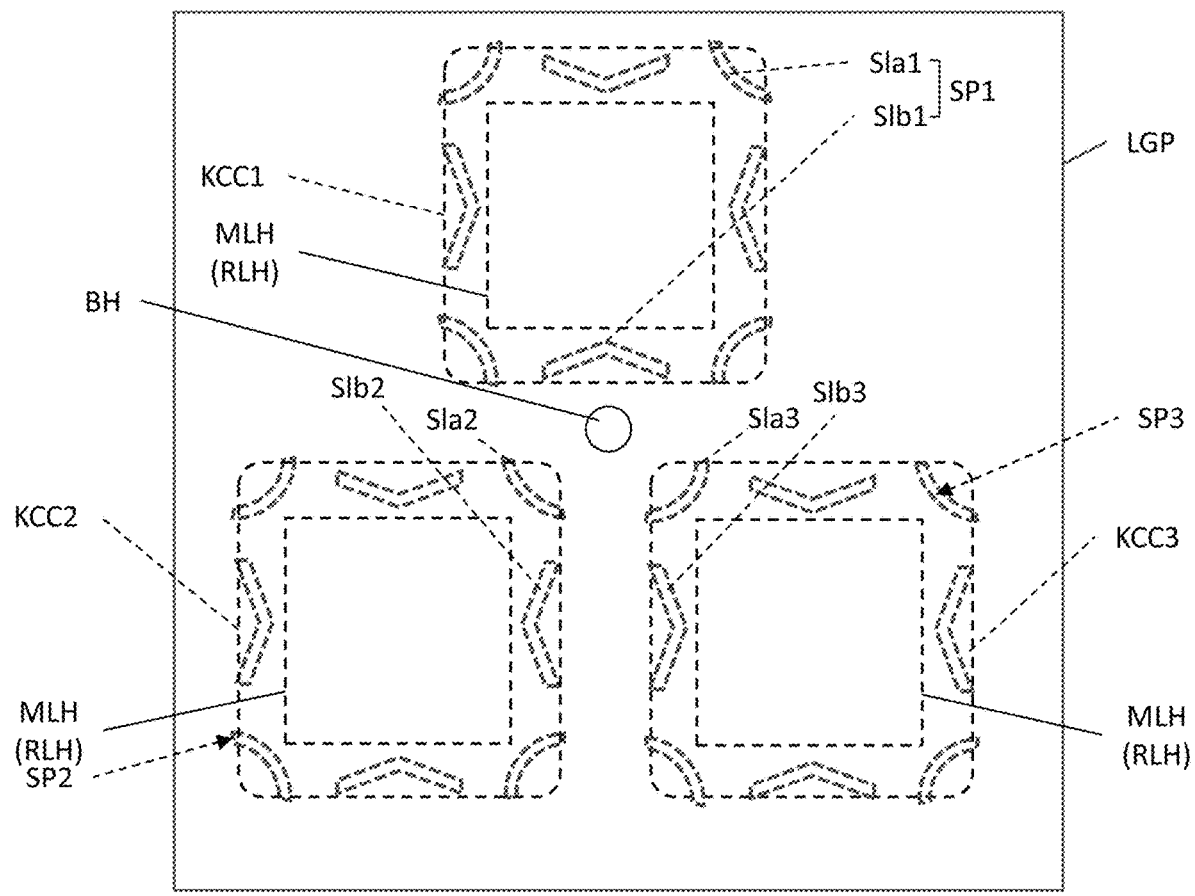
FIG. 12A is a partial top view of a slot pattern of a light guide panel of a backlight module according to another embodiment of the present invention.
Figure 12B:
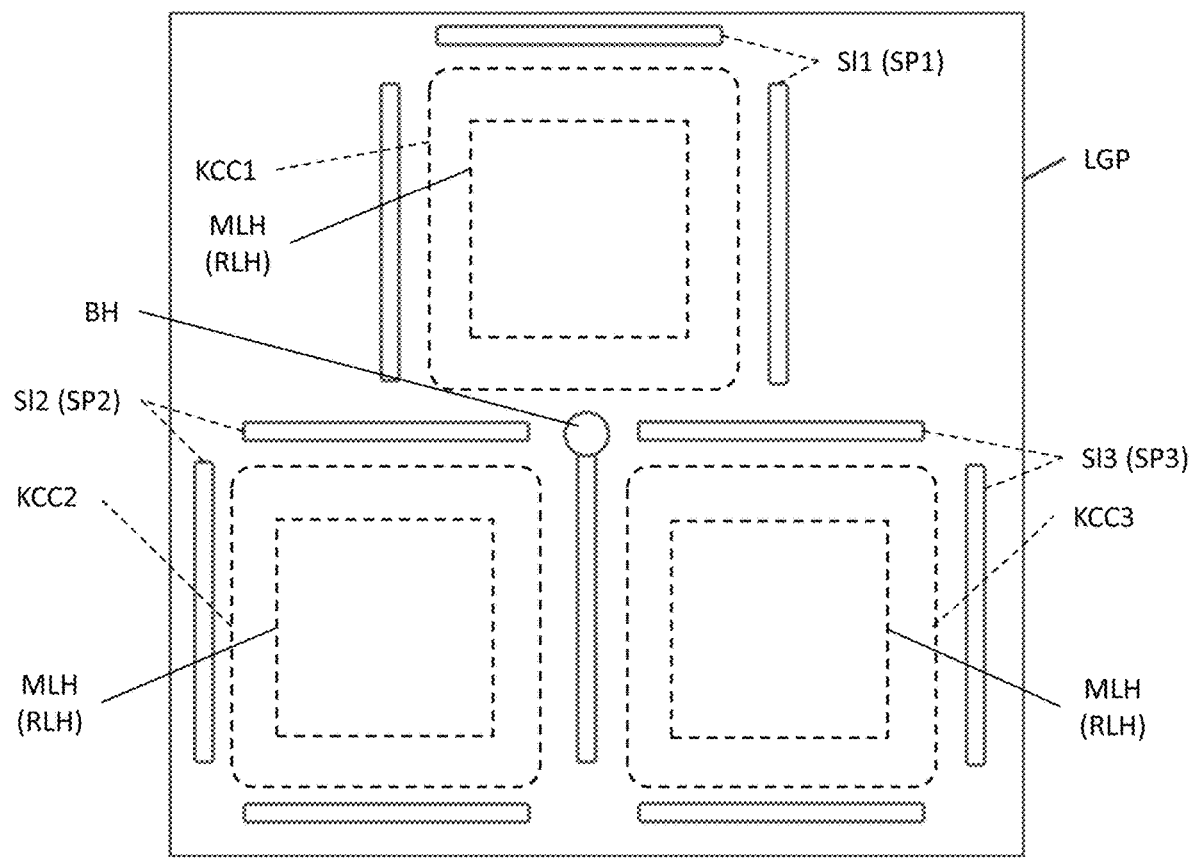
FIG. 12B is a partial top view of another slot pattern of the light guide panel of the backlight module according to another embodiment of the present invention.
Figure 13:
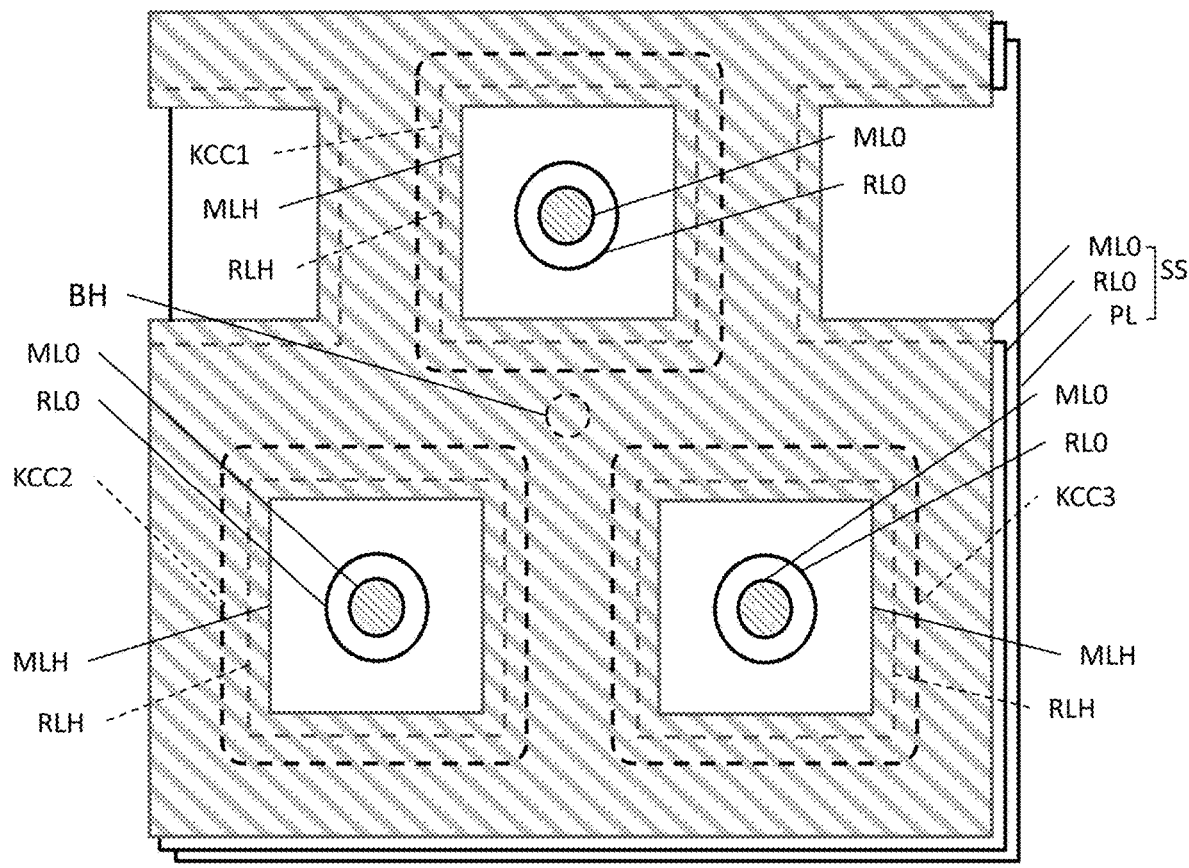
FIG. 13 is a partial top-view exploded diagram of s shielding sheet applied to the embodiments shown in FIG. 12A and FIG. 12B of the present invention.

Please refer to FIG. 12A, FIG. 12B, and FIG. 13. FIG. 12A is a partial top view of a slot pattern SP of the light guide panel LGP of the backlight module BLM according to another embodiment of the present invention, FIG. 12B is a partial top view of another slot pattern SP of the light guide panel LGP of the backlight module BLM according to another embodiment of the present invention, and FIG. 13 is a partial top-view exploded diagram of the shielding sheet applied to the embodiments shown in FIG. 12A and FIG. 12B of the present invention.

In FIG. 12A and FIG. 13, the light guide panel LGP has a slot pattern SP1/SP2/SP3 disposed corresponding to each keycap KCC1/KCC2/KCC3 to surround the reflective layer hole RLH or the mask layer hole MLH of the shielding sheet SS in FIG. 13. The slot pattern SP1 includes a plurality of slots Sla1 and Slb1 arranged around the reflective layer hole RLH and/or the mask layer hole MLH corresponding to the keycap KCC1. The slot pattern SP2 includes a plurality of slots Sla2 and Slb2 arranged around the reflective layer hole RLH and/or the mask layer hole MLH corresponding to the keycap KCC2. The slot pattern SP3 includes a plurality of slots Sla3 and Slb3 arranged around the reflective layer hole RLH and/or the mask layer hole MLH corresponding to the keycap KCC3. Each slot Sla1/Sla2/Sla3 and Slb1/Slb2/Slb3 of each slot pattern SP1/SP2/SP3 has three functions: blocking light, reflecting light and allowing light to exit. The slots Sla1/Sla2/Sla3 and Slb1/Slb2/Slb3 have air gaps formed therein, which can block light for solving the cross-key discoloration problem. The walls of the slots Sla1/Sla2/Sla3 and Slb1/Slb2/Slb3 can still provide total reflection within the critical angle range due to the characteristics of the light guide panel LGP, and the light reflection is helpful for recycling light and enhancing the chroma and saturation of color light of one single keyswitch. However, the light leakage problem caused by the slot patterns SP1/SP2/SP3 and the plurality of slots Sla1/Sla2/Sla3 and Slb1/Slb2/Slb3 needs to be solved.

Each slot pattern SP1/SP2/SP3 can be respectively disposed between the corresponding reflective layer hole RLH and an edge of the keycap KCC1/KCC2/KCC3; or each slot pattern SP1/SP2/SP3 can be respectively disposed between the corresponding mask layer hole MLH and the edge of the keycap KCC1/KCC2/KCC3. In other words, the slot patterns SP1/SP2/SP3 of the light guide panel LGP are correspondingly covered under the reflective layer RL2 or the mask layer ML of the shielding sheet SS in FIG. 13, or covered under the bridge rib Sr1 and/or the support frame Sf of the support plate SUP. Since sidewalls of the plurality of slots Sla1/Sla2/Sla3 and Slb1/Slb2/Slb3 of the slot patterns SP1/SP2/SP3 can allow a small amount of light to exit, unnecessary upward light leakage can be avoided by covering the plurality of slots Sla1/Sla2/Sla3 and Slb1/Slb1/Sla3 of each slot pattern SP1/SP2/SP3 under the reflective layer RL2 or the mask layer ML of the shielding sheet SS. In addition, covering the plurality of slots Sla1/Sla2/Sla3 and Slb1/Slb2/Slb3 of each slot pattern SP1/SP2/SP3 under the reflective layer RL2 of the shielding sheet SS can further reflect the recycled light back to the light guide panel LGP for lateral transmission. If necessary, each slot pattern SP1/SP2/SP3 could partially exceed the orthographic projection of the keycap KCC1/KCC2/KCC3.

In FIG. 12A, the slots Sla1/Sla2/Sla3 and Slb1/Slb2/Slb3 may pass through the light guide panel LGP or have a depth smaller than the thickness of the light guide panel LGP. The slots Sla1/Sla2/Sla3 correspond to the sides of the reflective layer holes RLH and/or the mask layer holes MLH, correspond to the sides of the keycaps KCC1/KCC2/KCC3, or selectively correspond to the corners of the reflective layer holes RLH and/or the mask layer holes MLH or the keycaps KCC1/KCC2/KCC3. The slots Slb1/Slb2/Slb3 correspond to the corners of the reflective layer holes RLH and/or the mask layer holes MLH, correspond to the corners of the keycaps KCC1/KCC2/KCC3, or selectively correspond to the sides of the reflective layer holes RLH and/or the mask layer holes MLH or the keycaps KCC1/KCC2/KCC3. The slots Sla1/Sla2/Sla3 and Slb1/Slb2/Slb3 can have different shapes. For example, the slots Sla1/Sla2/Sla3 may have a bending straight angle, such as 120 degrees-160 degrees. The slots Slb1/Slb2/Slb3 may be straight-shaped, arc-shaped (inward or outward convex), smooth-line shaped, or tooth-shaped. The cross-sectional shape, width and depth of the slots Slb1/Slb2/Slb3 could be fixed or partially changed. Bulge portions on a middle section of the slots Sla1/Sla2/Sla3 and Slb1/Slb2/Slb3 are all facing inward, such as toward the lighting unit LED, so as to reflect light to travel inward and away from the edges of the keycaps KCC1/KCC2/KCC3. The bulge portions on a middle section of the slots Sla1/Sla2/Sla3 and Slb1/Slb2/Slb3 could be formed by two intersecting straight or curved slot portions. The two straight slot portions could also be disconnected and non-intersecting. The bulge portions could be at least partially overlapped with the projections of the keycaps KCC1/KCC2/KCC3. The bulge portion has two slot portions adjacent or intersecting at an obtuse angle, allowing light to be reflected at a wider angle through the two slot portions of the bulge portion, so as to significantly improve the mixing of multi-color light or the brightness uniformity of single-color light within the range of a single keyswitch.

The slots Sl1/Sl2/Sl3 of the slot patterns SP1/SP2/SP3 in FIG. 12B have several differences from the slots Sla1/Sla2/Sla3 and Slb1/Slb2/Slb3 in FIG. 12A. First, the slots Sl1/Sl2/Sl3 in FIG. 12B are located in the gaps between the keycaps KCC1/KCC2/KCC3, that is, they are farther away from the lighting units LED and closer to the adjacent keycaps KCC1/KCC2/KCC3. If the blocking/reflecting effects of the slots Sl1/Sl2/Sl3 are not good, there may be more light leakage than that in FIG. 12A. However, since the slots Sl1/Sl2/Sl3 in FIG. 12B are disposed in the gaps between the keycaps KCC1/KCC2/KCC3, the light emitting paths of the lighting units LED within the orthographic projection ranges of on the keycaps KCC1/KCC2/KCC3 are longer to provide light for the keycaps KCC1/KCC2/KCC3, but the closer to the edges of the keycaps KCC1/KCC2/KCC3, the less and weaker the light is. Secondly, the slots Sl1/Sl2/Sl3 in FIG. 12B are all linear, which are parallel to or correspond to the sides of the reflective layer holes RLH and/or the sides of the mask layer holes MLH (or are parallel to or correspond to the sides of the keycaps KCC1/KCC2/KCC3). The linear slots Sl1/Sl2/Sl3 may provide a weaker one-direction reflection and mixing effect, which may need to be improved through curved or polygonal vertical cut surfaces. In addition, any of the slots Sl1/Sl2/Sl3 can be selectively connected to the board hole BH of the backlight module BLM. When the slots Sl1/Sl2/Sl3 are connected to the board hole BH, the light blocking effect is better. In addition, the light guide panel LGP is usually made of high polymer material, and obvious expansion and contraction of the light guide panel LGP may occur due to the temperature variations. When the slots Sl1/Sl2/Sl3 are connected to the board hole BH, the aforesaid influence caused by the temperature variations can be reduced.

On the whole, the light transmitted by the lighting unit LED to the edges of the keycaps KCC1/KCC2/KCC3 may have a relatively large proportion of total reflection and lateral transmission. How to reflect, recycle and turn the light before reaching the plurality of slots Sla1/Sla2/Sla3 and Slb1/Slb2/Slb3 of the slot patterns SP1/SP2/SP3 is the problem desired to be solved in the present invention. Furthermore, how to reduce the light to be incident into the adjacent keycaps KCC1/KCC2/KCC3 again when the light is still emitted through the side walls of the plurality of slots Sla1/Sla2/Sla3 and Slb1/Slb2/Slb3 of the slot patterns SP1/SP2/SP3 is also a problem to be further solved in the present invention.

Figure 14:
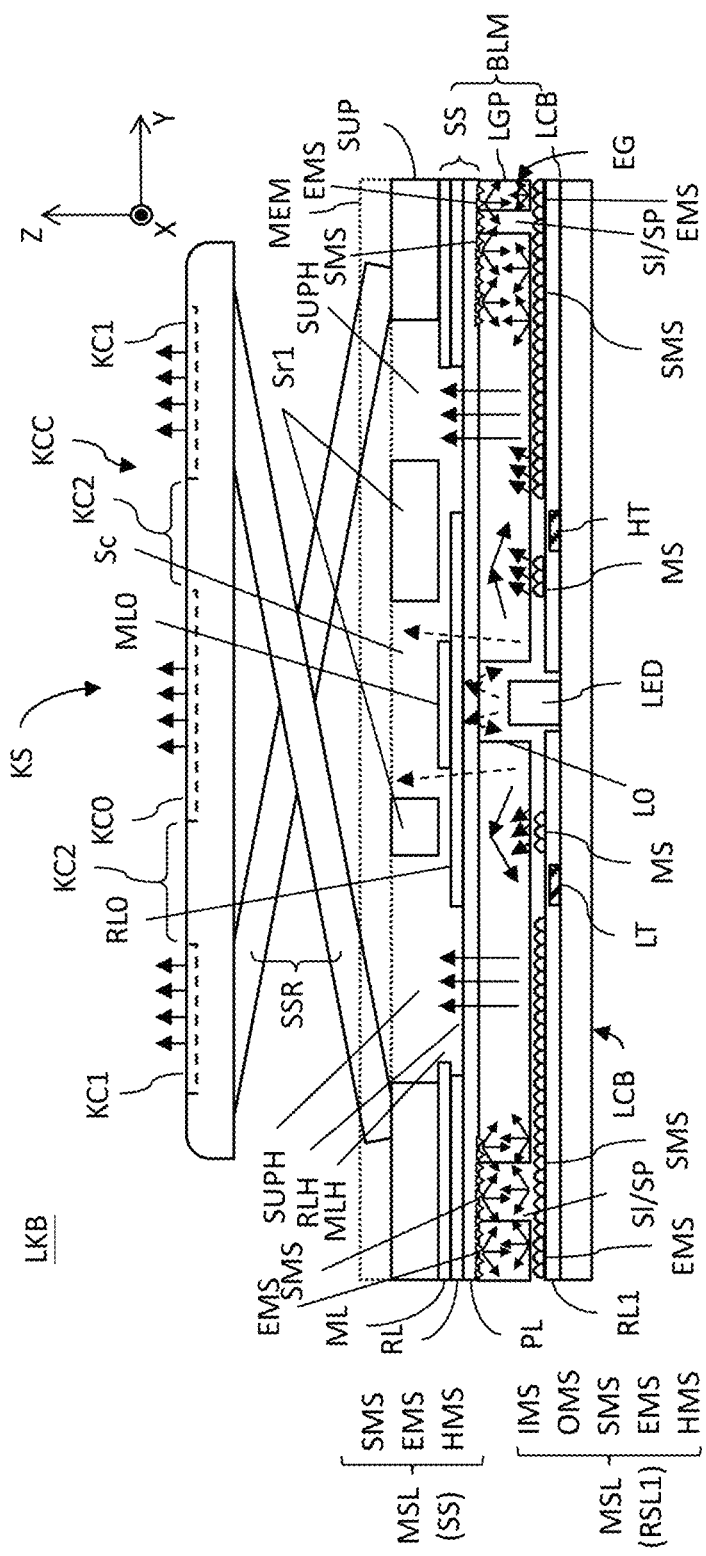
FIG. 14 is a partial cross-sectional diagram of a lighting keyboard according to another embodiment of the present invention.
Figure 15:
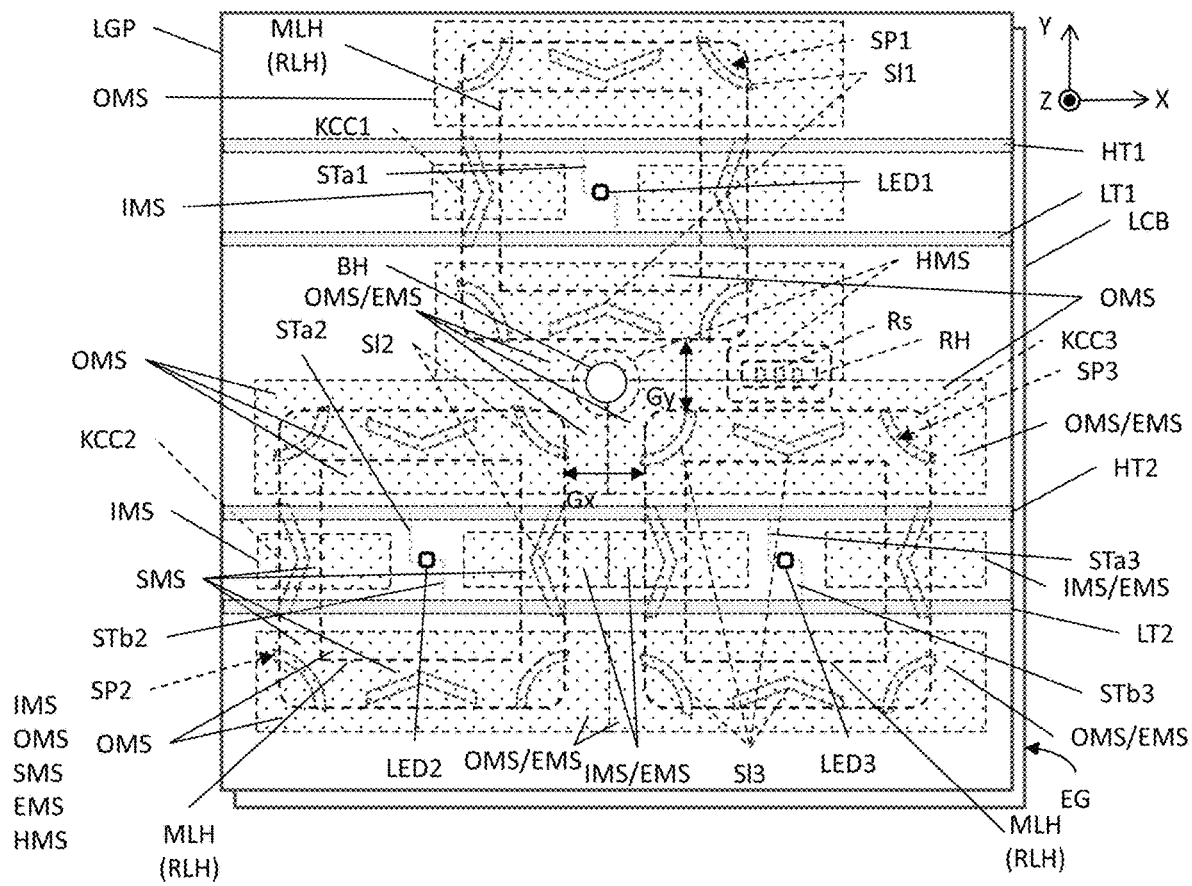
FIG. 15 is a partial top view of a light guide panel and a lighting board of a backlight module in FIG. 14.

For solving the aforesaid problems, the technical solution provided by the present invention is to form slot micro-structure regions SMS and edge micro-structure regions EMS. Please refer to FIG. 14 and FIG. 15 together with FIG. 12A, FIG. 12B and FIG. 13. FIG. 14 is a partial cross-sectional diagram of a lighting keyboard according to another embodiment of the present invention, and FIG. 15 is a partial top view of a light guide panel and a lighting board of a backlight module in FIG. 14.

First, in the Z direction, the slot micro-structure region SMS can be respectively disposed between the slots Sl/Sl1/Sl2/Sl3, Sla1/Sla2/Sla3 and Slb1/Slb2/Slb3 and the reflective layer holes RLH; or, the slot micro-structure region SMS can be respectively disposed between the slots Sl/Sl1/Sl2/Sl3, Sla1/Sla2/Sla3 and Slb1/Slb2/Slb3 and the mask holes MLH. The slot micro-structure region SMS can be formed by a plurality of micro-structure regions MS on the first reflective layer RL1 of the lighting board LCB in the aforesaid embodiments, such as the inner micro-structure regions IMS or the outer micro-structure regions OMS. The slot micro-structure region SMS could be disposed in parallel to the light guide panel LGP.

The slot micro-structure region SMS may also be disposed on the shielding sheet SS and in parallel to the light guide panel LGP. In practice, a part of the reflective layer RL can form a micro-structure with a diffusion effect, or one micro-structure region MS can be independently disposed under the reflective layer RL. For example, the reflective layer RL could adopt ink with larger-sized reflective particles, and when the reflective layer RL is sprayed or printed, concave/convex areas or irregular reflective surfaces are formed simultaneously, so that the reflective layer RL itself can form the micro-structure regions MS as the slot micro-structure region SMS; or, an independent layer of micro-structure regions MS could be sprayed or printed under the reflective layer RL to form irregular reflective surfaces as the slot micro-structure region SMS.

Furthermore, the slot micro-structure region SMS (and the edge micro-structure region EMS and a hole micro-structure region HMS introduced later) can also be disposed on the upper/lower surface of the light guide panel LGP, which is not shown in the figure for making the figure simple and clear. The micro-structure regions on the surface of the light guide panel LGP can be laser-engraved or stamped concave/convex micro-dots of any shape, or micro-dots made of reflective paint. The slot micro-structure region SMS on the surface of the light guide panel LGP can destroy the total reflection and directly provide a diffusion effect, including turning partial light to travel inward. On the other hand, the slot micro-structure region SMS on the shielding sheet SS and the slot micro-structure region SMS on the lighting board LCB are used to diffuse the light emitted from the upper and lower surfaces of the light guide panel LGP, so that the light can be partially reflected, partially recycled and partially turned.

In such a manner, before the light transmitted laterally from the light guide panel LGP reaches the slots Sl/Sl1/Sl2/Sl3, Sla1/Sla2/Sla3 and Slb1/Slb2/Slb3, the light can be partially reflected, partially recycled and partially turned by the slot micro-structure region SMS on the shielding sheet SS, the slot micro-structure region SMS on the light guide panel LGP, and the slot micro-structure region SMS on the lighting board LCB, which can greatly weaken and reduce the light reaching the slots Sl/Sl1/Sl2/Sl3, Sla1/Sla2/Sla3 and Slb1/Slb2/Slb3 and further reduces the amount of the light incident into the adjacent keycaps KCC1/KCC2/KCC3.

At the same time, no matter the slot micro-structure region SMS is located on the first reflective layer RL1 of the lighting board LCB or located on the shielding sheet SS, the slot micro-structure region SMS can be further overlapped with the slots Sl/Sl1/Sl2/Sl3, Sla1/Sla2/Sla3 and Slb1/Slb2/Slb3. In the X direction, the slot patterns SP/SP1/SP2/SP3 or the slots Sl/Sl1/Sl2/Sl3, Sla1/Sla2/Sla3 and Slb1/Slb2/Slb3 are covered by the shielding sheet SS and the first reflective layer RL1 of the lighting board LCB. If necessary, the slot patterns SP/SP1/SP2/SP3 or the slots Sl/Sl1/Sl2/Sl3, Sla1/Sla2/Sla3 and Slb1/Slb2/Slb3 could be selectively covered by the two slot micro-structure regions SMS on the shielding sheet SS and the first reflective layer RL1 of the lighting board LCB. The light entering the slots Sl/Sl1/Sl2/Sl3, Sla1/Sla2/Sla3 and Slb1/Slb2/Slb3 can be partially reflected, partially recycled and partially turned by the overlapped slot micro-structure regions SMS again, so as to further reduce the amount of light incident into the adjacent keycaps KCC1/KCC2/KCC3 together with the blocking effect provided by the air gap.

The edge micro-structure region EMS is disposed outside the slots Sl/Sl1/Sl2/Sl3, Sla1/Sla2/Sla3 and Slb1/Slb2/Slb3 on the light emitting path of the lighting unit LED. The edge micro-structure region EMS can be implemented on the lighting board LCB, the shielding sheet SS and the light guide panel LGP in the same manner as the slot micro-structure region SMS. In addition, since the slot micro-structure region SMS and the edge micro-structure region EMS are located before and after the slots Sl/Sl1/Sl2/Sl3, Sla1/Sla2/Sla3 and Slb1/Slb2/Slb3 on the light emitting path, it can also be said that the slots Sl/Sl1/Sl2/Sl3, Sla1/Sla2/Sla3 and Slb1/Slb2/Slb3 are surrounded and/or overlapped by the larger inner/outer micro-structure regions IMS/OMS.

According to the aforesaid configuration, in FIG. 15, the edge micro-structure region EMS located in the gap Gx between the keycaps KCC2/KCC3 can be achieved individually or jointly by any inner/outer micro-structure region IMS/OMS. The aforesaid edge micro-structure region EMS is located between a pair of slot patterns SP2/SP3, and the pair of slot patterns SP2/SP3 correspond to two adjacent keycaps KCC2/KCC3. In other words, the aforesaid edge micro-structure region EMS is located between at least one pair of slots Sl2/Sl3, and the at least one pair of slots Sl2/Sl3 partially surrounds two adjacent reflective layer holes RLH and/or two mask layer holes MLH. At the same time, the pair of slot patterns SP2/SP3, the edge micro-structure region EMS/inner micro-structure region IMS, the two adjacent reflective layer holes RLH and/or the two mask layer holes MLH are located between one set of the non-intersecting (main) traces HT2/LT2.

Similarly, the gap Gy between the keycaps KCC1 and KCC2/KCC3 can be achieved by the outer micro-structure region OMS. The edge micro-structure region EMS is located between three sets of slot patterns SP2/SP3, and the three sets of slot patterns SP2/SP3 correspond to three adjacent keycaps KCC1/KCC2/KCC3 and three adjacent lighting units LED1/LED2/LED3. In other words, the edge micro-structure region EMS/outer micro-structure region OMS is located between at least three slots Sl1/Sl2/Sl3, and the at least three slots Sl1/Sl2/Sl3 partially surround three adjacent reflective layer holes RLH or three mask layer holes MLH. The at least three slots Sl1/Sl2/Sl3 could be located between three sets of non-intersecting (sub) traces STa1/STb1, STa2/STb2 and STa3/STb3; or, the at least three slots Sl1/Sl2/Sl3 could be located between two sets of non-intersecting (main) traces HT1/LT1 and HT2/LT2. The two sets of non-intersecting (main) traces HT1/LT1 and HT2/LT2 respectively pass through (or are electrically connected to) the three adjacent lighting units LED1/LED2/LED3. The two sets of non-intersecting (main) traces HT1/LT1 and HT2/LT2 also pass through the three adjacent reflective layer holes RLH or the three mask layer holes MLH.

For the keycap KCC3, FIG. 15 also discloses a lighting board LCB combined with the light guide panel LGP. The lighting board LCB includes the light guide panel LGP, at least one pair of non-intersecting traces LT/HT (or STa/STb), at least two micro-structure regions IMS or OMS, and the lighting unit LED. The light guide panel LGP includes a panel hole L0 and at least two slots Sl3. The at least one pair of non-intersecting traces LT/HT (or STa/STb) is located under the light guide panel LGP. The at least two micro-structure regions IMS (or OMS) are spaced apart from each other, and the at least two micro-structure regions IMS (or OMS) do not overlap the pair of non-intersecting traces LT/HT (or STa/STb). The lighting unit LED is located in the panel hole L0 and between the at least two micro-structure regions IMS (or OMS). The at least two slots Sl3 are relatively disposed around the lighting unit LED, and the at least two micro-structure regions IMS (or OMS) are located between the at least two slots Sl3. The at least two micro-structure regions IMS located between the at least two slots Sl3 could be, for example, two inner micro-structure regions IMS within the reflective layer hole RLH/mask layer hole MLH of the shielding sheet SS corresponding to the keycap KCC3, or two outer micro-structure regions OMS within the reflective layer hole RLH/mask layer hole MLH.

Traditionally, those skilled in the art have a stereotype that the micro-structure may only be used in a region corresponding to a light emitting region (the reflective layer hole RLH and/or the mask layer hole MLH of the shielding sheet SS). Moreover, those skilled in the art also have a stereotype that the light-emitting/light-leakage region near a hole or edge of a light guide panel should intuitively utilize light-absorbing material instead of reflective material and the diffusion technology. The aforesaid and following embodiments of the present invention dispel these stereotyped concepts and achieve excellent technical effects on backlight module products with low-brightness lighting units and light guide panels.

In addition to the application for the adjacent keycaps KCC1/KCC2/KCC3, the aforesaid micro-structures can be further applied to reduce light leakage and recycle light, for example, to solve the light leakage problem at the board hole BH of the backlight module BLM (FIGS. 15-17) and the light leakage problem at the edge EG of the light guide panel LGP (FIGS. 14-17), recycle light from component holes RH of the light guide panel LGP (FIGS. 16 and 17) and so on.

Figure 16:
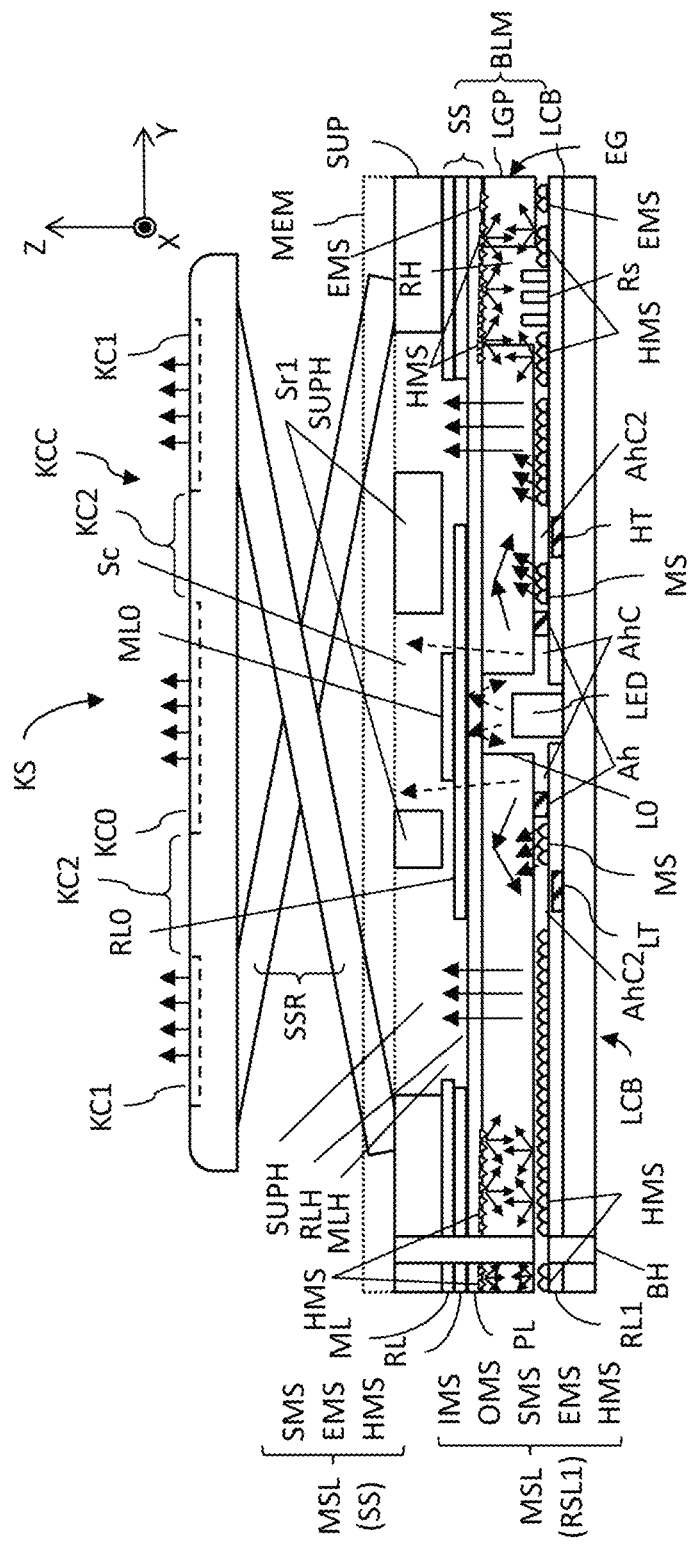
FIG. 16 is a partial sectional view of a lighting keyboard according to another embodiment of the present invention.
Figure 17:
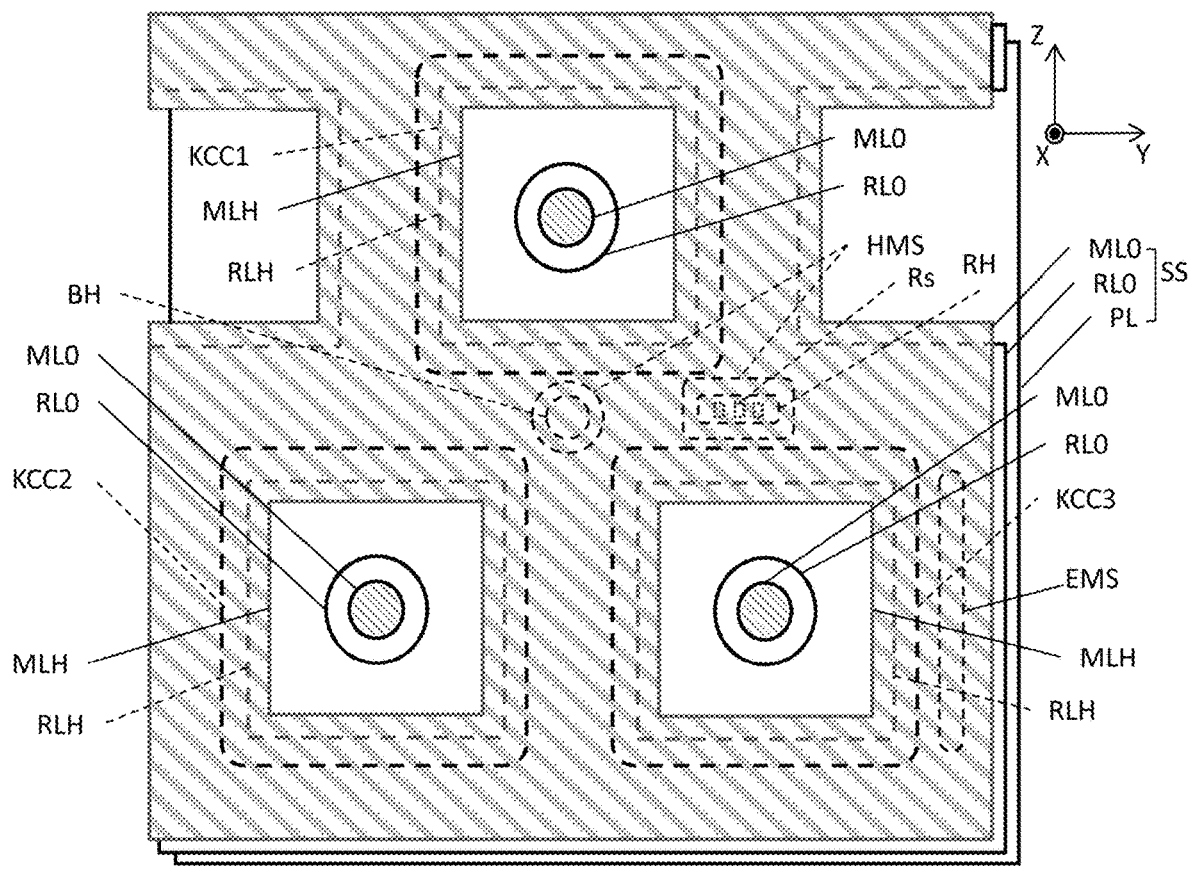
FIG. 17 is a partial top-view exploded diagram of a shielding sheet in FIG. 16 of the present invention.

Please refer to FIGS. 15-17 and FIGS. 12A, 12B, 13 and 14. FIG. 16 is a partial sectional view of a lighting keyboard according to another embodiment of the present invention. FIG. 17 is a partial top-view exploded diagram of a shielding sheet in FIG. 16 of the present invention.

In addition to the application for the adjacent keycaps KCC1/KCC2/KCC3, the edge micro-structure region EMS can also be applied to solve the light leakage problem at the edge EG of the light guide panel LGP (FIGS. 14-17). The edge micro-structure region EMS is formed between the edge EG of the light guide panel LGP and the adjacent (closest to the edge EG of the light guide panel LGP) reflective layer hole RLH and/or mask layer hole MLH. Since the slot Sl3 or the slot pattern SP3 also provides the light blocking effect, the edge micro-structure region EMS can also be regarded as being formed between the edge EG of the light guide panel LGP and the slot Sl3, or between the edge EG of the light guide panel LGP and the slot pattern SP3. In such a manner, the edge micro-structure region EMS, the slot Sl3 and the slot pattern SP3 can partially reflect, partially recycle, partially turn and partially block the light before the light reaches the edge EG of the LGP, so as to achieve the effect of reducing light leakage.

The hole micro-structure region HMS can be formed on the lighting board LCB, the shielding sheet SS or the light guide panel LGP in the same manner as the slot micro-structure region SMS. The hole micro-structure region HMS is disposed around the board hole BH of the backlight module BLM. The hole micro-structure region HMS is located between the board hole BH and the edge micro-structure region EMS in FIG. 15. The edge micro-structure region EMS can be seamlessly connected to the hole micro-structure region HMS, and both the edge micro-structure region EMS and the hole micro-structure region HMS can be achieved by at least one outer micro-structure region OMS between two sets of non-intersecting (main) traces HT1/LT1 and HT2/LT2. On the whole, at least one micro-structure region MS/HMS/EMS is located between three adjacent keycaps KCC1/KCC2/KCC (or three lighting units LED1/LED2/LED3). The at least one micro-structure region MS/HMS/EMS is also located between the board hole BH of the backlight module BLM and at least three slots Sl1/Sl2/Sl3. The at least three slots Sl1/Sl2/Sl3 partially surround the adjacent three reflective layer holes or three mask layer holes MLH. The at least three slots Sl1/Sl2/Sl3 can also be regarded as being located between two sets of non-intersecting (main) traces HT1/LT1 and HT2/LT2. To expand the scope, in FIG. 15, there is at least one slot Sl1/Sl2/Sl3 formed between the three multi-color lighting units LED1/

LED2/LED3 and the board hole BH. At least one micro-structure region MS/IMS/OMS is formed between each multi-color lighting unit LED1/LED2/LED3 and at least one corresponding slot Sl1/Sl2/Sl3. At the same time, there is at least one micro-structure region MS/HMS/EMS/OMS formed between the three slots Sl1/Sl2/Sl3 and the board hole BH. In such a manner, based on the multiplication of the diffusion effect of the micro-structure region and the blocking effect of the slot, the light can be partially reflected, partially recycled, partially turned, and partially blocked before reaching the board hole BH, thereby improving the light leakage problem of the board hole BH.

Furthermore, for recycling light from the component hole RH of the light guide panel LGP, the shielding sheet SS could cover the periphery and/or interior of the component hole RH of the light guide panel LGP, and the first reflective layer RL1 of the lighting board LCB could be partially overlapped with the periphery and/or interior of the component hole RH of the light guide panel LGP. The component hole RH is for accommodating at least one non-luminous component Rs (e.g., resistor, capacitor, driving chip or other non-luminous component required by light source circuit) protruding from the lighting board LCB. The aforesaid hole micro-structure region HMS could be disposed on the lighting board LCB, the shielding sheet SS and/or the light guide panel LGP and surround the component hole RH. The hole micro-structure region HMS could be also disposed on the lighting board LCB and/or the shielding sheet SS and overlapped with the interior of the component hole RH. Although there are limited concerns about light leakage in the component hole RH, the hole micro-structure region HMS can partially reflect, partially recycle and partially turn the light before and after the light reaches the component hole RH, so as to achieve full recycling and utilization of light.

The slot micro-structure region SMS, the edge micro-structure region EMS, the hole micro-structure region HMS and the inner/outer micro-structure regions IMS/OMS mentioned in the aforesaid embodiments are regions composed of plural micro-structures. In practice, the slot micro-structure region SMS, the edge micro-structure region EMS, the hole micro-structure region HMS and the inner/outer micro-structure regions IMS/OMS can be selectively integrated on one or more micro-structure layers MSL. For example, in FIGS. 14 and 15, a micro-structure layer MSL (first layer) could include the slot micro-structure region SMS, the edge micro-structure region EMS, the hole micro-structure region, and the inner/outer micro-structure regions IMS/OMS simultaneously disposed on the first reflective layer RL1 of the lighting board LCB. In FIGS. 14 and 15, a micro-structure layer MSL (second layer) could include the slot micro-structure region SMS, the edge micro-structure region EMS and the hole micro-structure region HMS (FIGS. 15 and 17) simultaneously disposed on the shielding sheet SS. If necessary, a micro-structure layer MSL (third layer, not shown in the figures) could be disposed on the light guide panel LGP. For example, the micro-structure layer MSL could include several micro-structure regions, which respectively correspond to the slot micro-structure region SMS, the edge micro-structure region EMS and the hole micro-structure region HMS of the shielding sheet SS.

Moreover, if it is desired to improve the backlight saturation and chroma of one single keyswitch, sufficient light mixing is also very important. Please refer to FIG. 18, which is a partial top-view exploded diagram of a lighting board according to another embodiment of the present invention. When the lighting unit LED is packaged with three chips to provide three color lights (e.g., red, green, and blue lights), the present invention adopts a specific design for achieving a preferable light mixing effect. First of all, the three chips could be arranged continuously from long side to long side. Its advantage is that the overall size of the lighting unit LED is relatively short and the lighting unit LED is less likely to interfere with the small-sized panel hole L0 when the chip offset occurs. However, its disadvantage is that the light mixing effect is poor since the long side of the chip with a large amount of light emission is blocked by the long side of the adjacent chip such that it is not easy to mix different color light. Another design is to arrange each long side of the three chips to be parallel to the long side of the lighting unit LED. That is, each long side of the three chips is arranged along the Y direction, or the three chips are arranged continuously from short side to short side. In such a manner, the long sides of the chips with a large amount of light emission and a large range of light output are all facing the X direction in the figure and overlapped with each other, and a better light mixing effect can be obtained within the two larger fan-shaped ranges in the X direction. At the same time, since the short sides of the chips with a small amount of light emission and a small range of light output are adjacent to each other in the Y direction, there is less light blocked by the short sides of the chips, so as to avoid the color shift problem.

In summary, in the embodiments provided in FIGS. 12A, 12B, 13, 14, 15, 16, 17 and 18 of the present invention, the optimal configuration of the micro-structure regions and the slots can improve the problem of color light being incident to the adjacent keycaps, and make full use of the limited light to achieve the best chroma and color saturation of one single keyswitch. The light mixing effect of the lighting unit LED can be further improved by the aforesaid arrangement of the three chips.

In the embodiments of the present invention mentioned above, the slots, in addition to their blocking effect, can enhance the brightness inside the slots when the lighting unit LED provides white light, thereby improving the illumination uniformity within the range of a single keyswitch. Furthermore, when the lighting unit LED packages multi-color chips for providing multi-color light, such as using 2 chips to provide cool-white/warm-white light, using 3 chips for red, green, blue light, or using 4 chips for red, green, blue, and white light, the further optimization of the shape and arrangement of the slots also enhances the light mixing effect. However, for current top-view light emitting units, such as mini-LEDs or micro-LEDs with multi-color chips, where the majority of light emission is directed upwards, even if the light can be guided laterally through the light guide panel LGP, a refined light mixing design is still needed to improve the color uniformity for one single keyswitch and the whole keyboard, and to ensure that the colors of adjacent keyswitches do not contaminate each other Please refer to FIG. 19, which is a partial top view of a backlight module according to another embodiment of the present invention. For the keycap KCC1, FIG. 19 discloses a lighting board LCB integrated with the light guide panel LGP. The lighting board LCB includes the light guide panel LGP, at least one pair of non-intersecting traces LT/HT (or STa/STb), at least two micro-structure regions IMS or OMS, and the lighting unit LED. The light guide panel LGP includes a panel hole L0 and plural sets of slots Slx/Sly/Slz, which intervally surround the lighting unit LED and the panel hole L0. "Intervally surround" includes two meanings: firstly, adjacent slots Slx/Sly/Slz are separated by a gap, meaning plural slots Slx/Sly/Slz are at least partially disconnected; secondly, the plural slots Slx/Sly/Slz are not closely attached to the lighting unit LED and the panel hole L0, but have a certain distance from the lighting unit LED and the panel hole L0.

Figure 18:
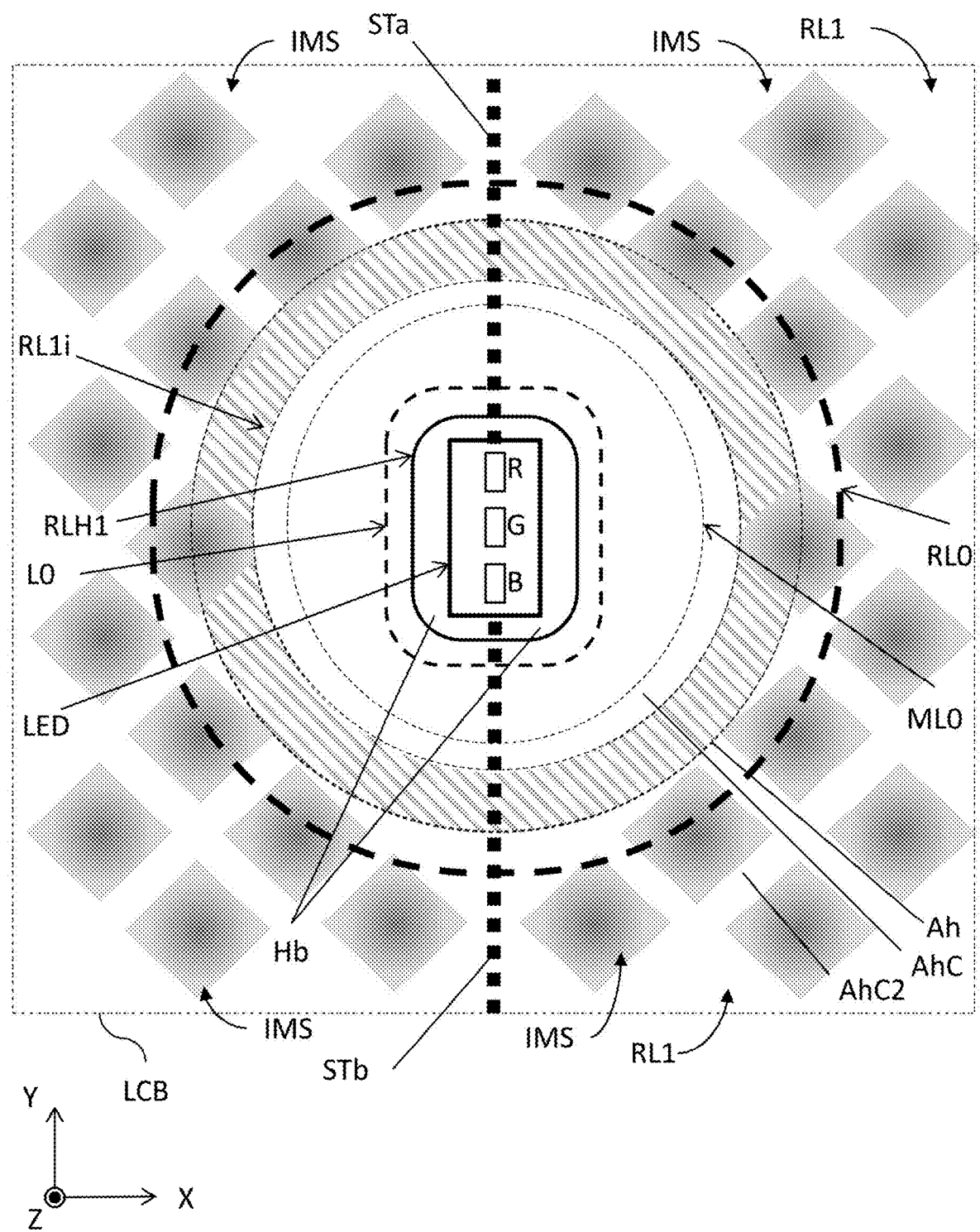
FIG. 18 is a partial top-view exploded diagram of a lighting board according to another embodiment of the present invention.
Figure 19:
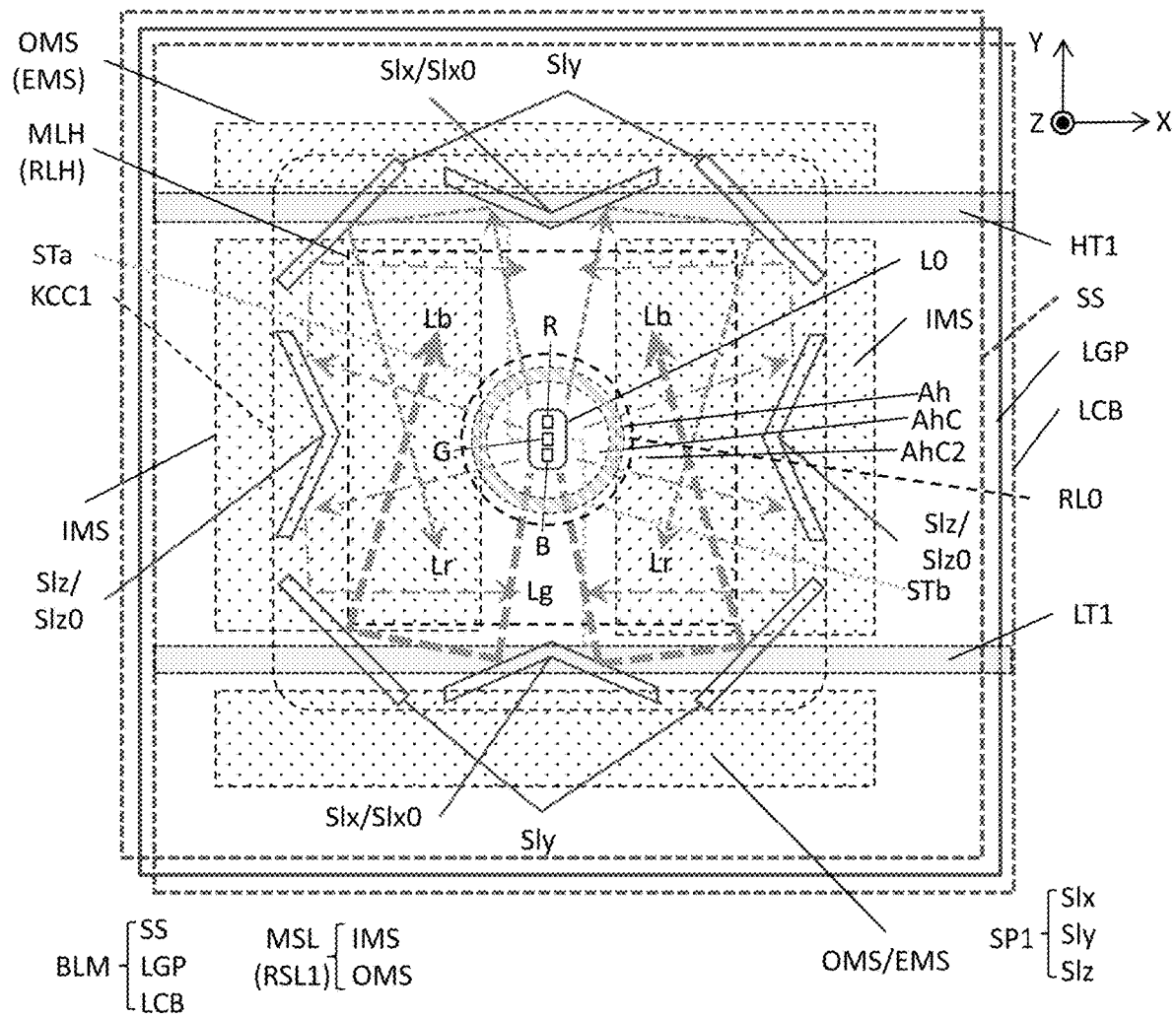
FIG. 19 is a partial top view of a backlight module according to another embodiment of the present invention.

In addition, referring to FIGS. 16, 18, and 19, an adhesive layer Ah could be disposed around the panel hole L0, and an adhesive clearance region AhC is formed between the panel hole L0 and the adhesive layer Ah and around the panel hole L0. This means that the wall of the panel hole L0 is located between the lighting unit LED and the adhesive clearance region AhC. The adhesive layer Ah is located above or beneath the light guide panel LGP, to fix the relative position of the panel hole L0 and the lighting unit LED. Relative movement between the panel hole L0 and the lighting unit LED could easily cause the wall of the panel hole L0 to break the electrical connection between the lighting unit LED and the lighting board LCB. However, since the adhesive layer Ah is also an excellent light path, allowing light to exit the light guide panel LGP, the adhesive layer Ah could have a gap to allow more light to travel further. Another function of the adhesive layer Ah is to mix multi-color light early. However, when the adhesive layer Ah is too close to the lighting unit LED, there won't be enough multi-color lights Lr/Lg/Lb intersecting with each other. Therefore, the adhesive layer Ah is preferably placed a certain distance from the panel hole L0 and the lighting unit LED, thereby forming the adhesive clearance region AhC. The existence of the adhesive clearance region AhC also prevents the adhesive layer Ah from shifting or overflowing into the panel hole L0 (it may contaminate the light-emitting surface of the lighting unit LED or cause poorly soldered lighting unit LEDs to fall off due to adhesion by the adhesive layer Ah) during the manufacturing process.

In all embodiments corresponding to the drawings of the present invention, the configuration of the adhesive clearance region AhC, the adhesive layer Ah, and the micro-structure regions MS (located on the light guide panel LGP, the lighting board LCB, or the shielding sheet SS) with the slots Sl/Sl1/Sl2/Sl3, Slx/Sly/Slz, is beneficial. It is found that in the thinning design that a thinner light guide panel LGP is utilized, the proportion of light scattering outside the light guide panel LGP increases. One possible reason is that the thinner light guide panel LGP has a smaller light entrance area, making it more difficult for light to enter laterally and form total internal reflection. Another reason is that to transmit light laterally over the same distance, the thinner light guide panel LGP requires the light to undergo more reflections and refractions, and with each reflection, a certain proportion of light is refracted and leaves the light guide panel LGP. This makes the contribution of the micro-structure regions MS located on the lighting board LCB or the shielding sheet SS in recycling light back into the light guide panel LGP even more important. Furthermore, the light exiting the light guide panel LGP through the adhesive layer Ah also needs to be reflected and scattered back into the light guide panel LGP by the aforesaid micro-structure regions MS and then transmitted further. Space between the slots Slx/Sly/Slz (or Sl/Sl1/Sl2/Sl3) and the adhesive layer Ah can be regarded as a second adhesive clearance region AhC2, allowing light exiting the light guide panel LGP through the adhesive layer Ah to be efficiently reflected and scattered back into the light guide panel LGP by the micro-structure regions MS. In a preferable arrangement, the adhesive layer Ah is located between the (first) adhesive clearance region AhC and the second adhesive clearance region AhC2, the adhesive layer Ah and the second adhesive clearance region AhC2 are both located between the (first) adhesive clearance region AhC and the slots Slx/Sly/Slz (or Sl/Sl1/Sl2/Sl3), or the second adhesive clearance region AhC2 is at least partially overlapped with the micro-structure regions MS (located on the light guide panel LGP, the lighting board LCB, or the shielding sheet SS).

In FIG. 19, a pair of bulge portions on a middle section of the slots Slx/Slz could be formed by two intersecting straight or curved slot portions. The two straight slot portions could also be disconnected and non-intersecting. The pair of bulge portions could be at least partially overlapped with the projection of the keycap KCC1. Each bulge portion has two slot portions adjacent or intersecting at an obtuse angle, allowing light to be reflected at a wider angle through the two slot portions of the bulge portion, so as to significantly improve the mixing of multi-color light or the brightness uniformity of single-color light within the range of a single keyswitch. Due to the presence of each pair of bulge portions Slx0/Slz0, the lights Lr/Lg/Lb can be reflected by the bulge portions Slx0/Slz0 of the slots Slx/Slz with the secondary reflection of the slot Sly, allowing the lights Lr/Lg/Lb to mix well at a distance far from the lighting unit LED. Without the bulge portions Slx0/Slz0 to expand the angle of reflection, the lights Lr/Lg/Lb would intersect repeatedly near the X-direction sides of the lighting unit LED (i.e., the central area of the keycap KCC1), possibly requiring multiple reflections to reach the edges of the keycap KCC1, or even failing to reach the edges of the keycap KCC1. It results in the peripheral area near the edges of the keycap KCC1 being greenish and dim in the X-direction corresponding to the green chip G, bluish and dim above the Y-direction corresponding to the blue chip B, and reddish and dim below the Y-direction corresponding to the red chip R, while the central area has uniform but overly bright mixed light. Although the slot Sly corresponding to the corner of the keycap KCC1 in FIG. 19 is straight, the slot Sly could also be curved like the slots Sl1/Sl2/Sl3 corresponding to the corners of the keycaps KCC1/KCC2/KCC3 in FIG. 15, with the bulge portions facing the lighting unit LED. In summary, the three color chips of the lighting unit LED could be arranged along the X or Y direction, and the slots Slx/Sly/Slz could have at least one pair of bulge portions Slx0/Sly0/Slz0 symmetrically arranged relative to the lighting unit LED, with each pair of bulge portions Slx0/Sly0/Slz0 arranged in a direction parallel, perpendicular, or at an approximate 45-degrees to the X or Y direction (as shown in FIGS. 12A and 15). Ideally, through the bulge portions Slx0/Sly0/Slz0 of the slots Slx/Sly/Slz, the lights Lr/Lg/Lb could be more mixed in the second adhesive clearance region AhC2 of FIGS. 18 and 19, and concentrated mixing of light in the (first) adhesive clearance region AhC and the adhesive layer Ah could be further reduced. Since the second adhesive clearance region AhC2 is located between the adhesive layer Ah and the slots Slx/Sly/Slz, the second adhesive clearance region AhC2 is mostly not covered by the inner reflective section RL0 of the shielding sheet SS, and the second adhesive clearance region AhC2 is also not partially covered by the outer frame of the mask layer ML or the outer frame of the second reflective layer RL2 of the shielding sheet SS. Thus, the well-mixed light in the second adhesive clearance region AhC2 can uniformly emit light through the micro-structure regions LMS of the light guide panel LGP or the micro-structure regions IMS of the lighting board LCB, and can pass through the peripheral holes SUPH of the support plate SUP overlapped with the second adhesive clearance region AhC2 (FIGS. 2-9) to illuminate a non-central area of the keycap KCC1

The intersecting and mixing of the lights Lr/Lg/Lb at a distance far from the lighting unit LED could also be achieved through other designs. Please refer to FIGS. 20A and 20B, which are partial top views of a backlight module according to another embodiment of the present invention. The light guide panel LGP (not shown) of the backlight module BLM has a pair of V-arc shaped (or seagull-shaped) slots Slx, each having one or more slot portions to form two bulge portions Slx0. The pair of slots Slx and the two bulge portions Slx0 are symmetrically arranged with respect to the lighting unit LED and the panel hole L0. The lighting unit LED and the panel hole L0 are located between the two bulge portions Slx0, which respectively face the lighting unit LED and the panel hole L0. The arrangement direction of the two bulge portions Slx0 is parallel to the Y direction, as is the arrangement direction of the multi-chips of the lighting unit LED. The difference between FIGS. 20A and 20B is that in FIG. 20B, the two slots Slx have a gap at the bulge portions Slx0 and are not connected.

Figure 20A:
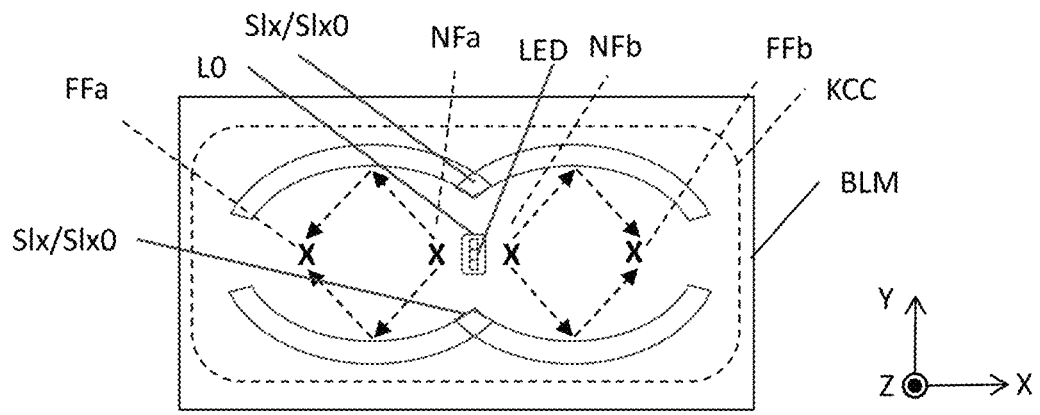
FIG. 20A, FIG. 20B, and FIG. 20C are partial top views of a backlight module according to another embodiment of the present invention.
Figure 20B:
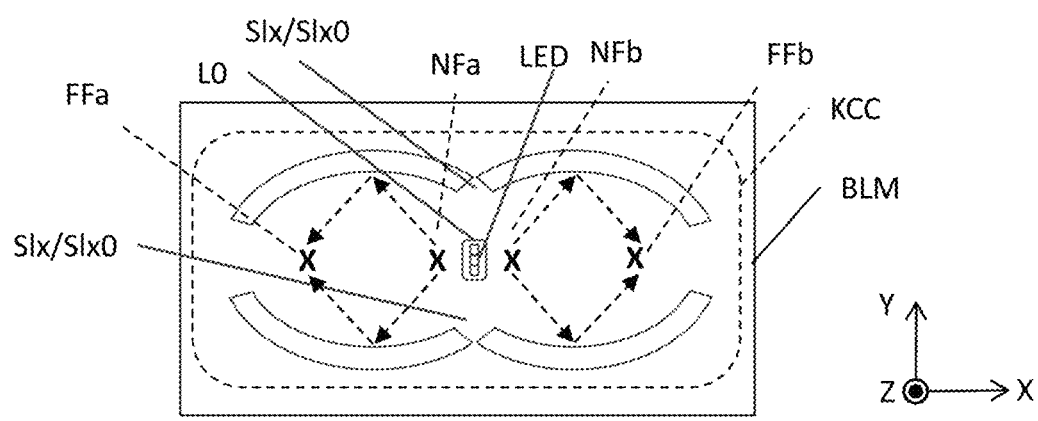
Figure 20C:
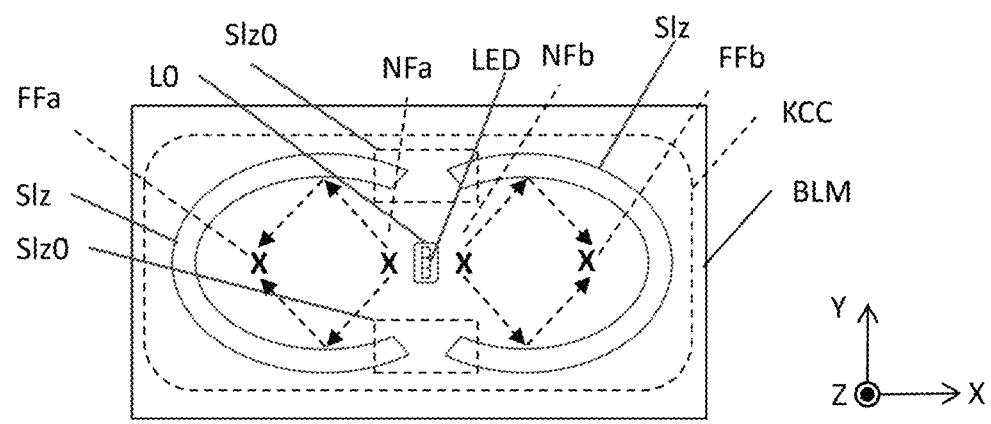

In FIGS. 20A and 20B, concave surfaces of arc-shaped walls of the V-shaped slots Slx face inward to together form two partially overlapping elliptical or quasi-elliptical shapes arranged along the X direction. Depending on the extent and overlapping range of the two slots Slx, the two elliptical shapes could include a plurality of semi-elliptical walls, all concave toward the inside, except for the two bulge portions Slx0. Depending on the requirements, lengths of the semi-elliptical walls could be sufficient to form ⅛, ⅙, ⅕, ¼, ⅓, ½, ⅔, ¾, ⅗, ⅘ of an ellipse, or could be equal to other similar semi-elliptical wall lengths. The two partially overlapping quasi-elliptical shapes have near focal points NFa/NFb close to the lighting unit LED and the panel hole L0 and have far focal points FFa/FFb. The reflective characteristic of light in an elliptical surface is such that the light passing through one focal point will be reflected by the elliptical surface and pass through the other focal point. A preferable embodiment is to position the lighting unit LED and the panel hole L0 to be located between the two near focal points NFa/NFb of the pair of slots Slx, or be overlapped with the two near focal points NFa/NFb. This ensures that multi-color light from the lighting unit LED passing through the two near focal points NFa/NFb can intersect and mix at or near the far focal points FFa/FFb, achieving a more uniform specific color within the range of a single keycap KCC. Since the keycaps KCC in FIGS. 20A and 20B are long rectangles, such as function keys, direction keys, or multiple keys in FIG. 1, the dual elliptical shapes formed by the two slots Slx are very suitable Please refer to FIG. 20C, which is a partial top view of a backlight module according to another embodiment of the present invention. The two V-arc shaped slots Slz nearly form a complete ellipse, for example, reaching ⅞, ⅚, or ⅘ of an ellipse, and are arranged along the X direction with the bulge portions Slz0 in the Y direction of the lighting unit LED. However, in FIG. 20C, the bulge portions Slz0 have a gap and are not connected. Furthermore, on the two outer sides along the X direction, the two slots Slz are fully connected, and the two slots Slx in FIGS. 20A and 20B have a gap and are not connected.

Figure 21:
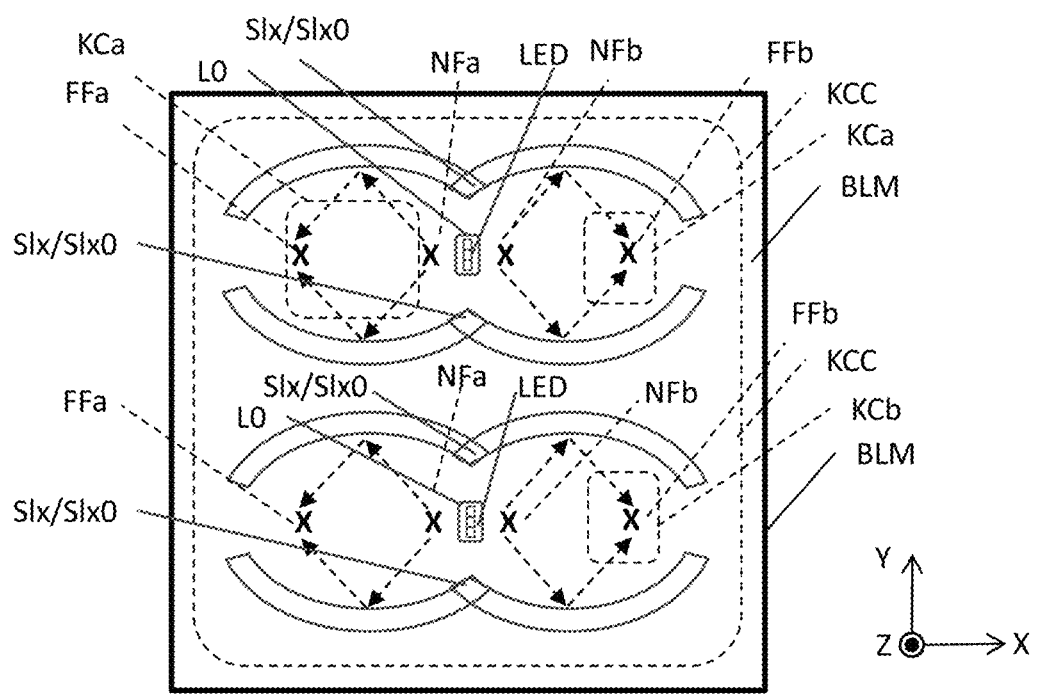
FIG. 21 is a partial top view of a backlight module according to another embodiment of the present invention.

For a square keyswitches with a length-width dimension close to 1:1, the shape formed by the plural slots Slx could be slightly adjusted. Please refer to FIG. 21, which is a partial top view of a backlight module according to another embodiment of the present invention. Two sets of dual-elliptical shapes are formed by two sets of double slots Slx, each corresponding to one lighting unit LED. Thus, two first light-transmitting areas KCa in the upper dual-elliptical range in FIG. 2 can provide the first color light through the corresponding lighting unit LED, and second light-transmitting areas KCb in the lower dual-elliptical range can provide the second color light different from the first color light, thereby achieving different backlight effects.

Figure 22:
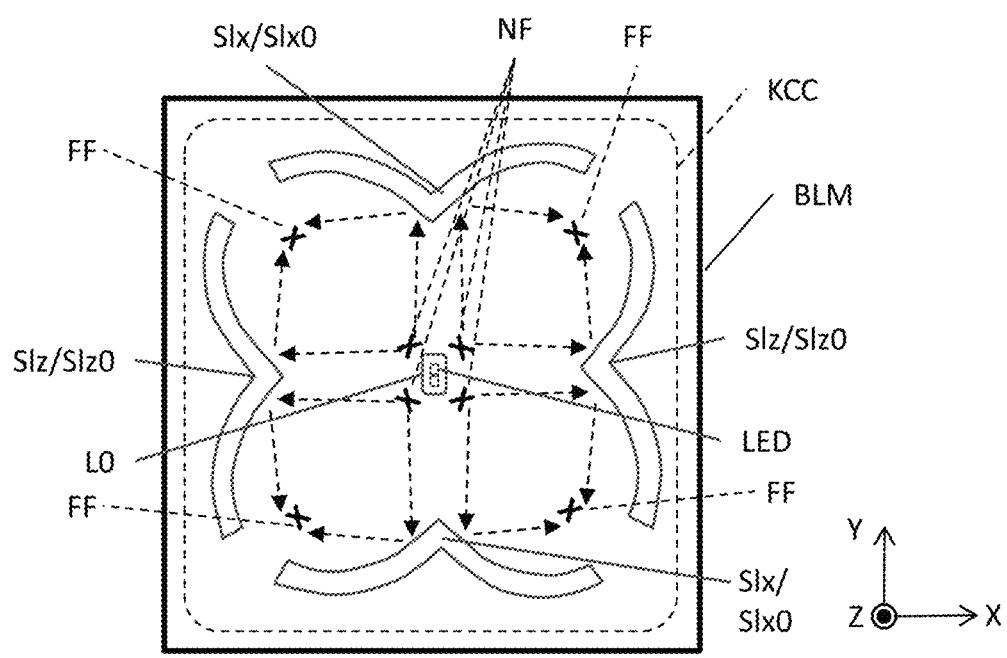
FIG. 22 is a partial top view of a backlight module according to another embodiment of the present invention.

Besides serving as two independent lighting ranges, the dual-elliptical shapes could also be used in a petal design with plural semi-elliptical shapes formed by plural sets of slots Slx/Slz. Please refer to FIG. 22, which is a partial top view of a backlight module according to another embodiment of the present invention. In FIG. 22, the light guide panel LGP has a pair of V-arc shaped slots Slx arranged along the Y direction, and has a pair of V-arc shaped slots Slz arranged along the X direction. The lengths of the two pairs of slots Slx/Slz could be slightly shorter than the edge length of the keycap KCC, and could be greater than ½ or ⅔ of the width of the mask layer hole MLH or the reflective layer hole RLH of the shielding sheet SS, or even equal to or greater than the width of the mask layer hole MLH or the reflective layer hole RLH of the shielding sheet SS. The two pairs of slots Slx/Slz are spaced around the lighting unit LED and the panel hole L0, for example, close to the edge of the keycap KCC. The two pairs of slots Slx/Slz have the bulge portions Slx0/Slz0 facing the lighting unit LED and the panel hole L0 respectively to together form four partially overlapping elliptical or quasi-elliptical shapes. The two slot portions at each bulge portion Slx0/Slz0, for example, are at an obtuse angle. As such, there could be four near focal points NF formed near or overlapped with the lighting unit LED and the panel hole L0 and four far focal points formed within the range surrounded by the two pairs of slots Slx/Slz. In FIG. 22, the lighting unit LED and the panel hole L0 are located between the four near focal points NF, and the four far focal points, along with the two pairs of slots Slx/Slz, together form four overlapping quasi-elliptical shapes corresponding to the four corners of the keycap KCC. As mentioned above, light passing through the near focal points NF will be reflected by the quasi-elliptical walls of the two pairs of slots Slx/Slz and pass through the corresponding four far focal points. This allows the multi-color chips of the lighting unit LED to expand the transmitting angle of the multi-color light, no longer limited to mixing near the lighting unit LED or in the central area of the keycap KCC, thus reducing the color shift problem and ensuring uniform mixing of light in the outer outlet KC1 corresponding to the corners of each keycap KCC (as shown in FIG. 3).

To prevent light leakage, the two pairs of slots Slx/Slz could be correspondingly covered beneath the reflective layer RL2 or the mask layer ML of the shielding sheet SS (as shown in FIG. 13), or covered by the bridge rib Sr1 and/or the support frame Sf of the support plate SUP (as shown in FIG. 14). The two pairs of bulge portions Slx0/Slz0, which are closer to the lighting unit LED and the panel hole L0, could not be entirely covered by the reflective layer RL2 or the mask layer ML of the shielding sheet SS, but only partially covered by the bridge ribs Sr1 of the support plate SUP. Since the support plate SUP is usually made of aluminum or steel, the bridge ribs Sr1 can also shield the light leakage from the two pairs of bulge portions Slx0/Slz0 and reflect the leaked light back into the light guide panel LGP. Reflecting and recycling light leakage from the two pairs of slots Slx/Slz could be also achieved by the micro-structure regions MS of the lighting board LCB that are overlapped with or surround the slots Slx/Slz (i.e., the micro-structure regions IMS/OMS/EMS as shown in FIG. 19).

However, if the slot SI is too far from the lighting unit LED, or if the slot pattern SP is too large, the improvement in light mixing efficiency might also be limited by the current/voltage supplied to the lighting unit LED. After all, a low-power lighting unit LED (e.g., Mini LED) has a small power output, and the light transmission distance of the low-power LED is too short. If insufficient current/voltage is provided, there might not be enough light reaching the edges of the keycap KCC for light mixing. Furthermore, as the lighting unit LED becomes smaller and the light guide panel LGP becomes thinner, it is more difficult for light of the lighting unit LED to enter and travel laterally through the light guide panel LGP. Moreover, the light entering the LGP is more likely to exit through the top or bottom surface of the light guide panel LGP due to various factors (e.g., the top and bottom surfaces of the light guide panel LGP being contaminated with impurities such that total internal reflection is disrupted). Therefore, the following embodiments provide technical solutions where the slot patterns SP and the slot SI are closer to the lighting unit LED.

Figure 23:
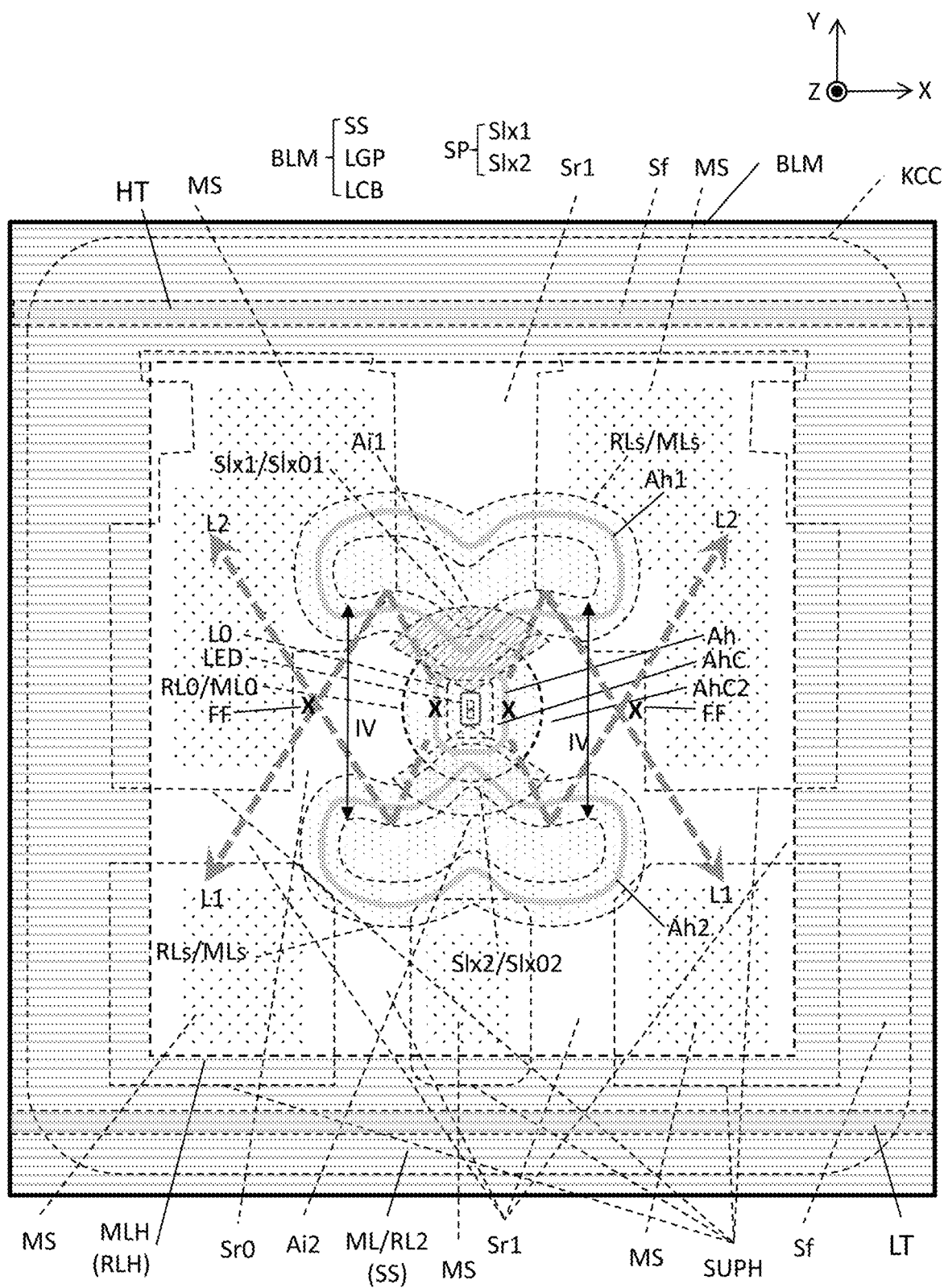
FIG. 23 is a partial top view of a backlight module according to another embodiment of the present invention.

Please refer to FIG. 23, which is a partial top view of a backlight module according to another embodiment of the present invention. In FIG. 23, the light guide panel LGP has a pair of V-arc shaped slots Slx1/Slx2 arranged along the Y direction. The pair of slots Slx1/Slx2 are spaced around the lighting unit LED and the panel hole L0, and are located between the non-intersecting main traces HT/LT (as shown with a narrower trace distance in FIGS. 2 and 11 and a wider trace distance in FIGS. 5 and 23). Compared to the previous embodiments, the slots Slx1/Slx2 are very close to the lighting unit LED and the panel hole L0 (i.e., located in the central area of the keycap KCC). To be more specific, the slots Slx1/Slx2 are located inside the mask layer hole MLH or the reflective layer hole RLH of the shielding sheet SS; alternatively, the slots Slx1/Slx2 are overlapped with the surrounding rib Sr0 and the inner hole Sc of the support plate SUP (also refer to FIG. 3, although the inner hole Sc is omitted in FIG. 23), making the slots Slx1/Slx2 surrounded by the plural peripheral holes SUPH of the support plate SUP in the projection (Z-direction) of the keycap KCC. Each of the slots Slx1/Slx2 has the bulge portions Slx01/Slx02 facing the lighting unit LED and the panel hole L0, and each bulge portion Slx01/Slx02 has two adjacent slot portions at an obtuse angle, for example. The inner reflective section RL0 of the shielding sheet SS is located between the two bulge portions Slx01/Slx02 of the two slots Slx1/Slx2. Thus, light from the lighting unit LED reflected by the inner reflective section RL0 (as shown in FIG. 16), along with reflection from the micro-structure regions MS of the lighting board LCB directly below the inner reflective section RL0 (as shown in FIGS. 16 and 18), can increase the amount of light entering the light guide panel LGP and travelling towards the two slots Slx1/Slx2. The light is reflected by the obtuse angle slot walls on two sides of the bulge portions Slx01/Slx02, thereby expanding the transmitting angle of the light. Although the micro-structure regions MS of the lighting board LCB in FIG. 23 are only depicted in a few locations, in reality, the micro-structure regions MS actually covers all areas outside the lighting unit LED and the traces HT/LT/STa/STb, referring to FIGS. 3 and 18.

The concave walls of the slot portions on the two sides of the bulge portions Slx01/Slx02 of the slots Slx1/Slx2 face inward, so as to make the slots Slx1/Slx2 in a near-symmetrical arrangement form two partially overlapping quasi-elliptical shapes. The lengths of the slots Slx1/Slx2 are shorter. For example, the lengths of the slots Slx1/Slx2 may not be greater than half the width of the mask layer hole MLH or the reflective layer hole RLH of the shielding sheet SS. The shorter lengths of the slots Slx1/Slx2 allow for a larger gap IV, permitting more lights L1/L2 to escape the slots Slx1/Slx2. The width of the gap IV, for example, could be greater than the width of the panel hole L0 (in the Y direction). Ideally, the width of the gap IV is close to or even not smaller than the width of the inner mask layer ML0 and/or the inner reflective section RL0 of the shielding sheet SS (in the Y direction). However, the lengths (in the X direction) of the slots Slx1/Slx2 may need to be greater than the width of the inner mask layer ML0 and/or the inner reflective section RL0 (in the X direction), perhaps reaching 1.2 times, 1.5 times, 1.8 times, or even twice the width of the inner mask layer ML0 and/or the inner reflective section RL0 (in the X direction), to reflect enough lights L1 and L2 to escape the slots Slx1/Slx2.

Therefore, in this embodiment, the lights L1 and L2 passing near the near focal points NF and the far focal points FF can reach the opposite corners of the keycap KCC, achieving the effect of reducing the color shift problem and ensuring even light mixing. That is, after being reflected by the slot Slx1, the light L1 can reach the two sides of the slot Slx2 and travel towards the two corners of the keycap KCC on the outer side of the slot Slx2. Conversely, the light L2, after being reflected by the slot Slx2, can reach the two sides of the slot Slx1 and travel towards the two corners of the keycap KCC on the outer side of Slx1.

Furthermore, since the slots Slx1/Slx2 of the light guide panel LGP are located in the light-transmitting area of the shielding sheet SS, that is, inside the mask layer hole MLH or the reflective layer hole RLH, a corresponding light leakage shielding structure is required. In FIG. 23, V-shaped slot mask sections MLs and/or V-shaped slot reflective sections RLs are disposed on the shielding sheet SS, completely covering the slots Slx1/Slx2. The shapes of the slot mask sections MLs and/or the slot reflective sections RLs correspond to the slots Slx1/Slx2, but outer diameters of the slot mask sections MLs and the slot reflective sections RLs are larger than those of the slots Slx1/Slx2. The slot mask sections MLs and/or the slot reflective sections RLs are located inside the mask layer hole MLH or the reflective layer hole RLH. The inner mask layer ML0 and/or the inner reflective section RL0 directly above the lighting unit LED are located between the slot mask sections MLs and/or the slot reflective sections RLs. In practice, the slot mask sections MLs and the slot reflective sections RLs could be used alternatively or simultaneously. The slot reflective sections RLs can reflect and recycle the light leakage, and even partially shield the light leakage, while the slot mask sections MLs absorbs the light leakage, ensuring that there is no excessive brightness caused by the light leakage.

In extreme cases, if the color shift problem still occurs or the light mixing uniformity is not as expected, color-adjusting layers Ai1 and Ai2 could be added near the lighting unit LED to pre-adjust the lights L1 and L2. The color-adjusting layers Ai1 and Ai2 are not limited to be disposed on the top or bottom surface of the shielding sheet SS. The color-adjusting layers Ai1 and Ai2 could also be located on the top or bottom surface of the light guide panel LGP, or on the top surface (i.e., the reflective layer RL) of the lighting board LCB. For example, if the first chip of the multi-color chips in the lighting unit LED, which is closest to the slot Slx1, emits the first color light (the light L1) as blue light, and the second chip, which is closest to the slot Slx2, emits the second color light (the light L2) as red light, a common color shift problem is that the mixed light in the outer area of the first chip is bluish and the mixed light in the outer area of the second chip is reddish. In this case, for the projection direction of the keycap KCC (Z-direction), the color-adjusting layer Ai1 could be disposed between the lighting unit LED and the slot Slx1, or the (first) color-adjusting layer Ai1 could be disposed between the inner reflective section RL0 (and/or the inner mask layer ML0) and the slot reflective sections RLs (and/or the slot mask sections MLs) on the same side. Similarly, the (second) color-adjusting layer Ai2 could be disposed between the lighting unit LED and the slot Slx2, or the color-adjusting layer Ai2 could be disposed between the inner reflective section RL0 (and/or the inner mask layer ML0) and the slot reflective sections RLs (and/or the slot mask sections MLs) on the same side. The color-adjusting layers Ai1 and Ai2 could have complementary colors of the first and second color lights, or other necessary adjusting colors. The color-adjusting layers Ai1 and Ai2 could be disposed above or below the inner reflective section RL0 (and/or the inner mask layer ML0).

Another potential possibility of the light leakage is the air gaps around the slots Slx1/Slx2 on the light guide panel LGP, i.e., the air gaps between the top surface of the light guide panel LGP and the bottom surface of the shielding sheet SS, or between the bottom surface of the light guide panel LGP and the top surface of the lighting board LCB. The air gaps may be enlarged due to the warping of the light guide panel LGP, a part of which originates from the process of punching the light guide panel LGP to form the slots Slx1/Slx2. Therefore, slot adhesives Ah1/Ah2 could be disposed around the slots Slx1/Slx2 to eliminate the air gaps, ensuring that the top and bottom surfaces of the light guide panel LGP around the slots Slx1/Slx2 are flush and adhered well to the bottom surface of the shielding sheet SS and the top surface of the lighting board LCB, respectively. The slot adhesives Ah1/Ah2 could be disposed between the top surface of the light guide panel LGP and the bottom surface of the shielding sheet SS or between the bottom surface of the light guide panel LGP and the top surface of the lighting board LCB alternatively or simultaneously. The adhesive layer Ah and the adhesive clearance region AhC surrounding the lighting unit LED and the panel hole L0 are located between the two slot adhesives Ah1/Ah2 and also between the two slots Slx1/Slx2. To prevent the slot adhesives Ah1/Ah2 from causing premature light emission, the slot adhesives Ah1/Ah2 could also have notches on the side facing the lighting unit LED, allowing sufficient light to reach and be reflected by the slots Slx1/Slx2.

Finally, it should be clarified that the quasi-elliptical shapes formed by the slots SI in the aforementioned embodiments do not necessarily have to be perfect ellipses, and the light from the lighting unit LED are not restricted to pass through the near focal points NF and the far focal points FF. As long as the light passes near the near focal points NF, the light can still reach the vicinity of the far focal points FF. In some experimental examples, the V-shape of the slots Slx1/Slx2 is not formed by arc-shaped slot portions. As long as the slots Slx1/Slx2 form a V-shape with an obtuse angle, the slots Slx1/Slx2 can still enable the lights L1 and L2 to reach the opposite corners of the keycap KCC. In other words, the slots Slx1/Slx2 with the bulge portions Slx01/Slx02 are not limited to forming quasi-elliptical structures or arc-shaped slot walls. Via the aforesaid length design of the slots Slx1/Slx2 in the X-direction, combined with the width design of the gap IV in the Y-direction and the appropriate obtuse angle of the V-shape of the slots Slx1/Slx2, the slots Slx1/Slx2 can reflect enough lights L1 and L2 to escape the slots Slx1/Slx2 and reach the opposite corners of the keycap KCC.

In summary, since the slot patterns SP and the slots SI are closer to the lighting unit LED, and the bulge portions of the slots can expand the light transmitting angle, the travelling directions of different color lights are partially altered in the initial stages of light emission where the amount of light is abundant. This causes the light mixing effect to occur in advance around the lighting unit LED and the panel hole L0, thereby further enhancing the light mixing effect and uniformity. Provided that sufficient current and voltage are supplied, and as long as the illumination is powerful enough, the aforementioned slot patterns SP and the slots Slx could also be disposed far from the lighting unit LED and the panel hole L0 to be located near the edges of the keycap KCC (both inside and outside). This can still achieve the desired uniform light mixing effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module for illuminating at least one keycap, the backlight module comprising:
    a lighting unit;
    a light guide panel having a panel hole to accommodate the lighting unit, the light guide panel further comprising a plurality of slots intervally surrounding the lighting unit; and
    a lighting board having at least one pair of non-intersecting traces electrically connected to the lighting unit, the lighting board further comprising at least one microstructure region located between the at least one pair of non-intersecting traces;
    wherein at least one of the plurality of slots has a bulge portion facing toward the lighting unit, and a protruding direction of the bulge portion is parallel to the light guide panel.

2. The backlight module of claim 1, wherein the plurality of slots comprises at least one pair of bulge portions arranged symmetrically relative to the lighting unit.

3. The backlight module of claim 1 further comprising:
    an adhesive layer surrounding the panel hole, a first adhesive clearance region being located between the adhesive layer and the panel hole.

4. The backlight module of claim 3, wherein a second adhesive clearance region is located between the adhesive layer and the plurality of slots.

5. The backlight module of claim 4, wherein the backlight module further comprises a shielding sheet, the shielding sheet comprises a reflective layer hole allowing light to pass therethrough, and the reflective layer hole is overlapped with the second adhesive clearance region.

6. The backlight module of claim 1, wherein the backlight module further comprises a shielding sheet, and the shielding sheet comprises an inner reflective section partially covering the lighting unit.

7. The backlight module of claim 1, wherein the at least one micro-structure region is at least partially overlapped with the plurality of slots of the light guide panel.

8. The backlight module of claim 1, wherein the backlight module further comprises a shielding sheet, and an outer frame of a mask layer of the shielding sheet at least partially covers the plurality of slots.

9. The backlight module of claim 1, wherein the lighting unit has a plurality of chips arranged along a Y direction, the plurality of slots has at least one pair of bulge portions arranged symmetrically relative to the lighting unit, and an arrangement direction of the at least one pair of bulge portions is parallel, perpendicular, or at a 45-degree angle to the Y direction.

10. The backlight module of claim 1, wherein the lighting board further comprises a first reflective layer, and the micro-structure region is located on a surface of the first reflective layer.

11. The backlight module of claim 1, wherein the lighting unit comprises at least two chips providing at least two color lights, and the at least two chips are arranged continuously from short side to short side.

12. The backlight module of claim 1, wherein at least one of the plurality of slots is located between or partially overlapped with the pair of non-intersecting traces.

13. The backlight module of claim 1, wherein the bulge portion of one of the plurality of slots is V-arc shaped.

14. The backlight module of claim 1, wherein the bulge portion is at an obtuse angle.

15. A lighting keyboard comprising:
a plurality of keyswitch having a keycap respectively; and
a backlight module of claim 1 located under the plurality of keyswitches.

16. A backlight module for illuminating at least one keycap, the backlight module comprising:
a lighting unit;
a light guide panel having a panel hole to accommodate the lighting unit, the light guide panel further comprising two slots disposed opposite to the lighting unit; and
a lighting board comprising at least one micro-structure region reflecting light and facing toward the light guide panel;
wherein the two slots have a bulge portion respectively protruding to the lighting unit, a protruding direction of each bulge portion is parallel to the light guide panel, and the two slots form concave arcs opposite to each other at two sides of the bulge portion respectively, such that the two slots together form two partially overlapping quasi-elliptical shapes.

17. The backlight module of claim 16, wherein the backlight module further comprises a shielding sheet, and lengths of the two slots are not greater than half a width of a mask layer hole of the shielding sheet.

18. The backlight module of claim 16, wherein the backlight module further comprises a shielding sheet, the shielding sheet has an inner reflective section covering above the lighting unit, the light guide panel further comprises a gap located between the two slots, and a width of the gap is not smaller than a width of the inner reflective section.

19. The backlight module of claim 16, wherein the backlight module further comprises a shielding sheet, the shielding sheet has an inner reflective section covering above the lighting unit, and lengths of the two slots are greater than a width of the inner reflective section.

20. A backlight module for illuminating at least one keycap, the backlight module comprising:
a lighting unit;
a light guide panel having a panel hole to accommodate the lighting unit, the light guide panel further comprising two slots oppositely surrounding the lighting unit;
a shielding sheet disposed above the light guide panel, the shielding sheet having an inner reflective section covering above the lighting unit; and
a lighting board having at least one micro-structure region reflecting light and facing toward the light guide panel;
wherein the two slots have a bulge portion respectively protruding to the lighting unit, a protruding direction of each bulge portion is parallel to the light guide panel, and the inner reflective section of the shielding sheet is located between the two bulge portions of the two slots.

21. The backlight module of claim 20, wherein the backlight module further comprises a color-adjusting layer disposed between the slot and the panel hole.

22. A lighting board comprising:
a light guide panel comprising a panel hole and at least two slots having at least two bulge portions, a protruding direction of each bulge portion being parallel to the light guide panel; and
a substrate disposed in parallel to the light guide panel, at least one pair of non-intersecting traces being disposed on the substrate and electrically connected to a lighting unit;
wherein the lighting unit is located in the panel hole, and the lighting unit is located between the at least two bulge portions of the at least two slots.

* * * * *